(12) United States Patent
Chandra et al.

(10) Patent No.: US 10,942,767 B2
(45) Date of Patent: Mar. 9, 2021

(54) DEEP NEURAL NETWORK WORKLOAD SCHEDULING

(71) Applicant: Microsoft Technology Licensing, LLC, Redmond, WA (US)

(72) Inventors: Ranveer Chandra, Kirkland, WA (US); Rahul Anand Sharma, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 15/906,963

(22) Filed: Feb. 27, 2018

(65) Prior Publication Data

US 2019/0266015 A1 Aug. 29, 2019

(51) Int. Cl.
*G06F 9/48* (2006.01)
*G06F 9/50* (2006.01)
(Continued)

(52) U.S. Cl.
CPC .............. *G06F 9/4881* (2013.01); *G06F 9/48* (2013.01); *G06F 9/4806* (2013.01); *G06F 9/4843* (2013.01); *G06F 9/4887* (2013.01); *G06F 9/50* (2013.01); *G06F 9/505* (2013.01); *G06F 9/5005* (2013.01); *G06F 9/5011* (2013.01); *G06F 9/5016* (2013.01); *G06F 9/5027* (2013.01); *G06F 9/5044* (2013.01); (Continued)

(58) Field of Classification Search
CPC . G06F 9/48; G06F 9/50; G06F 9/4806; G06F 9/4843; G06F 9/4881; G06F 9/4887; G06F 9/5005; G06F 9/5011; G06F 9/5027; G06F 9/5061; G06F 9/5072; G06F 9/5077; G06N 3/00; G06N 3/02; G06N 3/08
See application file for complete search history.

(56) References Cited

U.S. PATENT DOCUMENTS

2008/0320482 A1\* 12/2008 Dawson ................ G06F 9/5027
718/104
2009/0007125 A1\* 1/2009 Barsness ............... G06F 9/5077
718/104
(Continued)

OTHER PUBLICATIONS

Verhelst, et al., "Embedded Deep Neural Network Processing: Algorithmic and Processor Techniques Bring Deep Learning to IoT and Edge Devices", In Proceedings of the IEEE Solid-State Circuits Magazine, Jan. 1, 2017, pp. 55-65.
(Continued)

*Primary Examiner* — Charles M Swift
(74) *Attorney, Agent, or Firm* — Schwegman Lundberg & Woessner, P.A.

(57) ABSTRACT

Systems, methods, and computer-executable instructions for scheduling neural network workloads on an edge device. A performance model for each neural network model is received. Parameters for each neural network workload is determined based on an associated performance model. Processing core assignments are determined from a plurality of processing cores for each neural network workload based on the corresponding performance model and processing core utilization. Image streams are received and associated with a neural network workload. Each neural network workload is scheduled to run on the processing cores based on the processing core assignments.

20 Claims, 15 Drawing Sheets

(51) Int. Cl.
| | |
|---|---|
| G06N 3/00 | (2006.01) |
| G06N 3/08 | (2006.01) |
| G06N 3/04 | (2006.01) |
| G06N 3/063 | (2006.01) |
| G06N 3/02 | (2006.01) |

(52) U.S. Cl.
CPC .......... *G06F 9/5061* (2013.01); *G06F 9/5072* (2013.01); *G06F 9/5077* (2013.01); *G06N 3/00* (2013.01); *G06N 3/02* (2013.01); *G06N 3/0454* (2013.01); *G06N 3/063* (2013.01); *G06N 3/08* (2013.01)

(56) References Cited

U.S. PATENT DOCUMENTS

| | | | | |
|---|---|---|---|---|
| 2009/0288090 | A1* | 11/2009 | Ujibashi | G06F 9/5011 718/103 |
| 2012/0159494 | A1* | 6/2012 | Shafiee | G06F 9/5038 718/102 |
| 2014/0026147 | A1* | 1/2014 | Cherkasova | G06F 9/505 718/105 |
| 2014/0298343 | A1* | 10/2014 | Rajan | G06F 9/5027 718/102 |
| 2015/0058845 | A1* | 2/2015 | Song | G06F 9/45558 718/1 |
| 2016/0170800 | A1* | 6/2016 | Di Balsamo | G06F 9/4887 718/104 |
| 2016/0380908 | A1* | 12/2016 | Larsson | G06F 9/5072 709/226 |
| 2017/0357530 | A1* | 12/2017 | Shih | G06F 9/5038 |
| 2018/0024868 | A1* | 1/2018 | Mehta | G06F 9/5083 718/104 |
| 2018/0052711 | A1* | 2/2018 | Zhou | G06F 9/46 |
| 2018/0089532 | A1* | 3/2018 | Xu | G06K 9/4652 |
| 2018/0150325 | A1* | 5/2018 | Kuo | G06F 9/5005 |
| 2019/0286478 | A1* | 9/2019 | Sengupta | G06F 9/5083 |

OTHER PUBLICATIONS

Huang, et al., "When Deep Learning Meets Edge Computing", In Proceedings of the IEEE 25th International Conference on Network Protocols, Oct. 10, 2017, 2 Pages.

Kim, et al., "Performance Analysis of CNN Frameworks for GPUs", In Proceedings of IEEE International Symposium on Performance Analysis of Systems and Software, Apr. 24, 2017, pp. 55-64.

Li, et al., "Learning IoT in Edge: Deep Learning for the Internet of Things with Edge Computing", In Proceedings of the IEEE Network, Jan. 1, 2018, pp. 96-101.

Liu, et al., "A New Deep Learning-Based Food Recognition System for Dietary Assessment on an Edge Computing Service Infrastructure", In Proceedings of the IEEE Transactions on Services Computing vol. 11, Issue 2, Jan. 31, 2017, pp. 249-261.

"International Search Report and Written Opinion Issued in PCT Application No. PCT/US2019/018845", dated May 28, 2019, 15 Pages.

"AMS 6500 Machinery Health Monitor", Retrieved From <<https://www.emerson.com/en-us/automation/asset-management/asset-monitoring/condition-monitoring/ams-6500-machinery-health-monitor>>, Retrieved on: Dec. 21, 2017, 5 Pages.

"Stress-ng—a tool to load and stress a computer system", Retrieved From <<http://manpages.ubuntu.com/manpages/xenial/man1/stress-ng.1.html>>, Mar. 12, 2016, 30 Pages.

Abadi, et al., "TensorFlow: Large-scale machine learning on heterogeneous distributed systems", In Journal of the Computing Research Repository, Mar. 2016, pp. 1-19.

Al-Rfou, et al., "Theano: A Python framework for fast computation of mathematical expressions", In Journal of the Computing Research Repository, May 2016, pp. 1-19.

Bonomi, et al., "Fog computing and its role in the internet of things", In Proceedings of the first edition of the MCC workshop on Mobile cloud computing, Aug. 17, 2012, pp. 13-15.

"Keras-team/keras", Retrieved From <<https://github.com/keras-team/keras>>, Retrieved on: Dec. 21, 2017, 4 Pages.

Chollet, Francois, "Xception: Deep learning with depthwise separable convolutions", In Journal of the Computing Research Repository, Oct. 2016, 8 Pages.

Collobert, et al., "Torch7: A Matlab-like Environment for Machine Learning", In Proceedings of Workshop on Algorithms, Systems, and Tools for Learning at Scale, Dec. 16, 2011, pp. 1-6.

Cuervo, et al., "Maui: making smartphones last longer with code offload", In Proceedings of the 8th international conference on Mobile systems, applications, and services, Jun. 15, 2010, 14 Pages.

"The Mobile Broadband Standard", Retrieved From <<http://www.3gpp.org/release-15>>, Retrieved on: Dec. 21, 2017, 2 Pages.

Greenberg, et al., "The cost of a cloud: research problems in data center networks", In Proceedings of Computer Communication Review, vol. 39, No. 1, Jan. 2009, 6 Pages.

Han, et al., "Deep compression: Compressing deep neural networks with pruning, trained quantization and huffman coding", In Journal of the Computing Research Repository, Oct. 2015, pp. 1-14.

He, et al., "Deep residual learning for image recognition", In Journal of the Computing Research Repository, Dec. 2015, pp. 1-12.

Hu, et al., "Mobile Edge Computing a key technology towards 5G", In ETSI White Paper, Sep. 2015, pp. 1-16.

Huang, et al., "Densely connected convolutional networks", In Proceedings of the IEEE Conference on Computer Vision and Pattern Recognition, Jul. 21, 2017, 9 Pages.

Iandola, et al., "Squeezenet: Alexnet-level accuracy with 50x fewer parameters and <0.5mb model size", International Conference on Learning Representations, Apr. 24, 2017, pp. 1-13.

Jia, et al., "Caffe: Convolutional architecture for fast feature embedding", In Proceedings of the 22nd ACM International Conference on Multimedia, Nov. 3, 2014, 4 Pages.

Joulin, et al., "Fasttext.zip: Compressing text classification models", In Journal of the Computing Research Repository, Dec. 2016, pp. 1-13.

Jouppi, et al., "In-datacenter performance analysis of a tensor processing unit", In Proceedings of the 44th Annual International Symposium on Computer Architecture, Jun. 24, 2017, pp. 1-12.

Krizhevsky, et al., "ImageNet classification with deep convolutional neural networks", In Proceedings of the 25th International Conference on Neural Information Processing Systems, vol. 1, Dec. 3, 2012, pp. 1-9.

Kuhn, Harold W., "The hungarian method for the assignment problem", In Journal of Naval Research Logistics, vol. 2, Issue 1-2, Mar. 1955, pp. 29-47.

Lin, et al., "Microsoft COCO: Common Objects in Context", In Proceedings of European conference on computer vision, Sep. 2014, pp. 1-15.

Mao, et al., "Resource management with deep reinforcement learning", In Proceedings of the 15th ACM Workshop on Hot Topics in Networks, Nov. 9, 2016, pp. 50-56.

Rastegar, et al., "Xnor-Net: Imagenet classification using binary convolutional neural networks", In Proceedings of European Conference on Computer Vision, Oct. 8, 2016, pp. 1-17.

Salunkhe, et al., "Intelligent mirror: Detecting skin cancer (melanoma) using convolutional neural network with augmented reality feedback", In International Journal of Computer Applications, vol. 154, No. 6, Nov. 2016, pp. 4-7.

Sanger, Terence D., "Optimal unsupervised learning in a single-layer linear feedforward neural network", In Journal of Neural Networks, vol. 2, Issue 6, Dec. 1989, pp. 459-473.

Satyanarayanan, et al., "The case for vm-based cloudlets in mobile computing", In Proceedings of IEEE Pervasive Computing, vol. 8, Issue 4, Oct. 2009, pp. 14-23.

Wang, et al., "Image quality assessment: from error visibility to structural similarity", In Proceedings of IEEE transactions on image processing, vol. 13, Issue 4, Apr. 2004, pp. 1-14.

"Microsoft/CNTK", Retrieved From <<https://github.com/Microsoft/CNTK>>, Retrieved on: Dec. 21, 2017, 5 Pages.

(56) References Cited

OTHER PUBLICATIONS

Simonyan, et al., "Very deep convolutional networks for large-scale image recognition", In Journal of the Computing Research Repository, Sep. 4, 2014, pp. 1-14.

Szegedy, et al., "Going deeper with convolutions", In Proceedings of the IEEE conference on computer vision and pattern recognition, Jun. 7, 2015, pp. 1-12.

Teerapittayanon, et al., "Distributed deep neural networks over the cloud, the edge and end devices", In Proceedings of IEEE 37th International Conference on Distributed Computing Systems, Jun. 5, 2017, 12 Pages.

Vasisht, et al., "Farmbeats: An iot platform for data-driven agriculture", In Proceedings of the 14th USENIX Symposium on Networked Systems Design and Implementation, Mar. 27, 2017, pp. 515-529.

\* cited by examiner

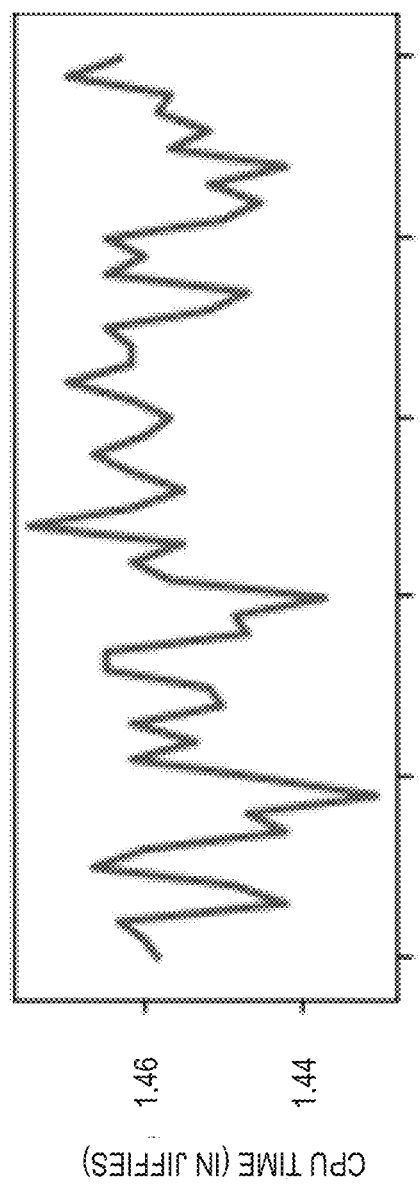
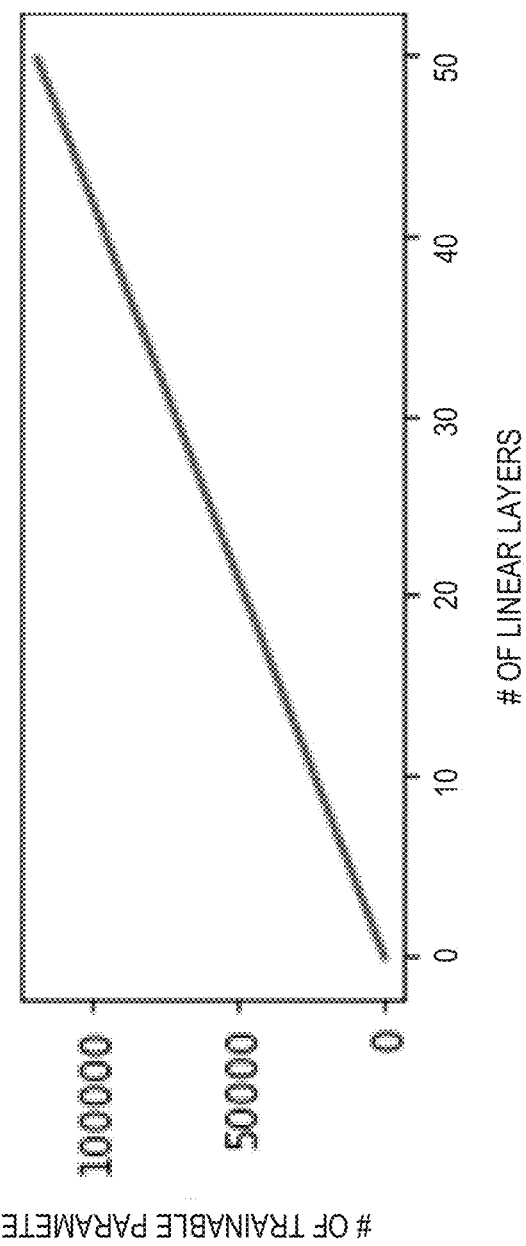
FIG. 6C
FIG. 6D

DEEP NEURAL NETWORK WORKLOAD SCHEDULING

BACKGROUND

Applications for the Internet-of-Things (IoT) devices may operate in scenarios where connectivity to cloud computing resources is weak or non-existent. Cloud connectivity issues commonly arise for industry vertical applications, such as agriculture, oil and gas, energy, and mining. One technique to overcome weak connectivity is to use a powerful edge device, such as a gateway device. The edge device may perform computation locally, such as drone video processing or asset monitoring to prevent machine downtime, to avoid transmitting gigabytes of data to the cloud.

Using edge resources of a network is also being considered as an important component for next generation wireless systems, such as 5G. For example, within the 5G standard, computing using edge resources is expected to enable next generation applications with unique requirements, such as low latency, lesser cloud bandwidth consumption, and improved battery life of mobile devices.

Standard IoT workloads, such as, streaming analytics, device management, etc., may be run on edge devices. However, there is an interest in running the compute-heavy workload of Deep Neural Networks (DNNs) on edge devices. DNNs are multi-layered machine learning frameworks that build models from large amounts of training data. DNNs have been shown to be useful for various types of data, especially for classification images, audio, and video streams. For example, in an IoT application, several cameras could be mounted on the ground or on a mining truck, etc., and the DNNs may be trained to flag security alerts or detect anomalies in the system.

DNNs have also been shown to help with Augmented Reality (AR), and Virtual Reality (VR) workloads. Instead of running DNNs in the cloud, there are several benefits of running the DNN on edge devices. One benefit is that the system may run offline. Furthermore, streaming all the images to the cloud may consume too much bandwidth, and likely would add latency to an application.

Despite the benefits of running DNNs on edge devices, supporting a typical DNN on an edge device scenario for IoT or 5G applications is not trivial. Such applications require the edge device to support multiple cameras and multiple DNN models, e.g., for body detection, cow detection, facial recognition, etc. Ideally, each DNN on each camera stream runs on a dedicated core to help the DNN execute on a useful frame rate, e.g., 30 frames per second (fps). However, a typical edge device has limited GPU and CPU resources. Hence there is a challenge to support multiple cameras, each with multiple DNN models, to achieve acceptable performance on a typical edge device.

BRIEF DESCRIPTION OF THE DRAWINGS

FIGS. 6A, 6B, 6C, and 6D illustrate analysis of CPU requirements and parameters for convolutional and linear layer in accordance with respective examples.

DETAILED DESCRIPTION

Figure 1:
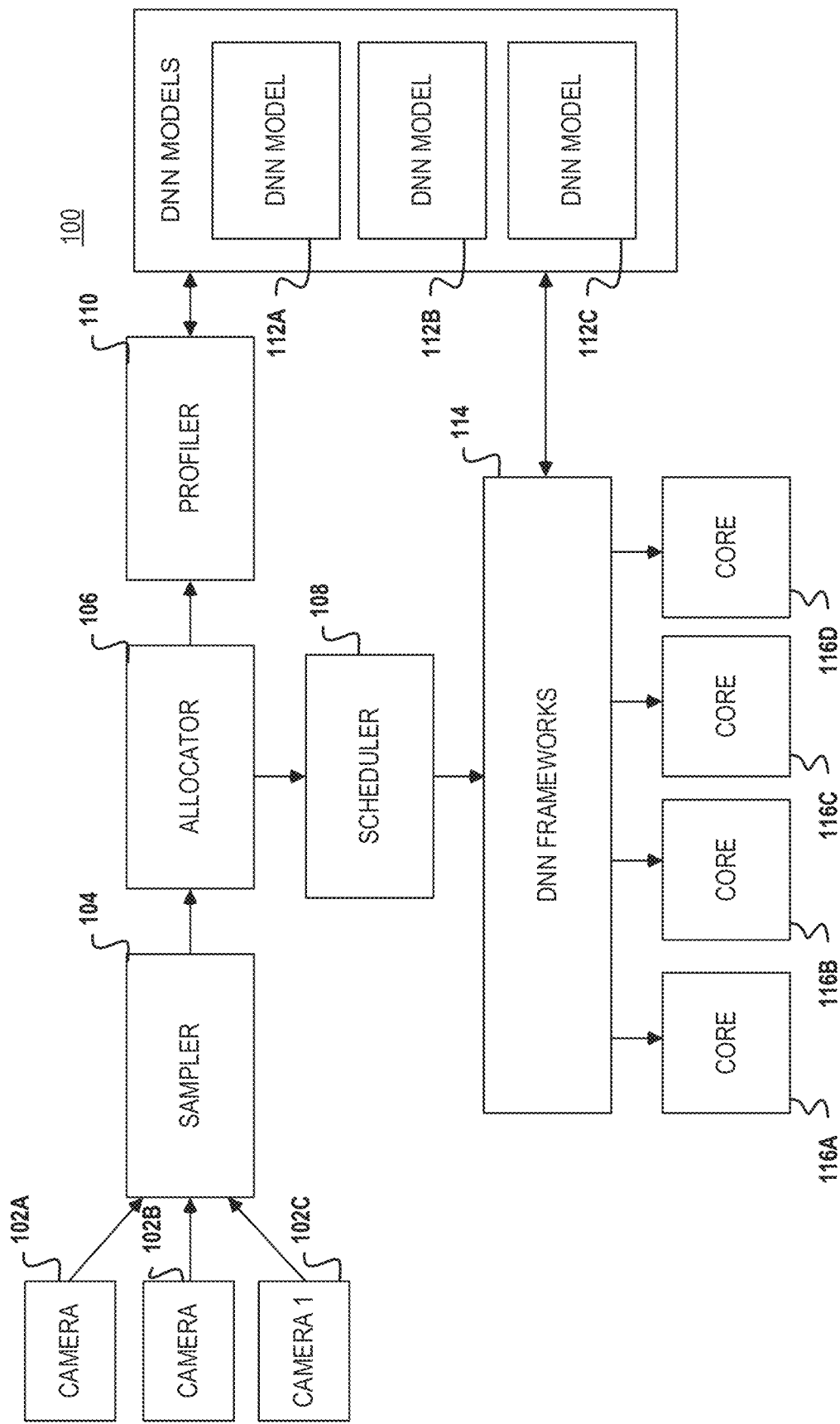
FIG. 1 is a system diagram of a framework that supports DNN workloads on an edge device in accordance with respective examples.

As the hardware and processing resources of edge devices are limited, effective use of these resources is important. Efficient scheduling of workloads allows resources of edge devices to process more workloads more efficiently compared with current scheduling frameworks. Current scheduling frameworks do not take advantage of features of DNNs and may result in schedules that do not take full advantage of the available resources of an edge device. For example, current scheduling frameworks do not take advantage of the structure of DNNs. In various embodiments, the structure of DNNs is used to more efficiently schedule workloads. Efficient scheduling allows DNN workloads to run more efficiently without the need to increase hardware features or network bandwidth of the edge device. In addition, the DNN workloads are scheduled to ensure that no DNN workload is starved, even when the overall workload increases.

Disclosed herein are embodiments for handling deep learning workloads on a network edge. Insights about the structure of DNNs are leveraged to enable various features are the disclosed embodiments. For example, DNN workloads are scheduled to achieve best performance for small workloads. Performance gracefully degrades when the workload increase, while ensuring that no stream is starved. Multiple models and multiple camera streams are supported even when the models use different DNN architectures and frameworks.

Example embodiments have been built and tested. Performance has been compared against traditional schedulers and resource allocators used in existing operating systems. In various experiments, embodiments achieved a 4× speedup over alternative approaches.

As described above, network resources may be saved by running IoT applications on an edge device. An IoT application may use deep neural networks (DNNs). DNNs are multi-layered neural networks, and are extremely adept at learning models from large amounts of training data. One popular class of DNNs are called Convolutional Neural networks (CNNs) and are used widely across various domains such as text, image, and speech processing. These models are typically trained in the cloud, and are then run either on end-user devices or in the cloud. A DNN model may be made available as a web service. Some recent advances in DNNs and DNN ASICs have shown that DNNs may be run on the end-user device. For example, mobile phones may have a security feature that uses facial recognition based on deep learning.

The DNN models that have been developed are extremely diverse. They may be as shallow as a two-layer neural network to as deep as having 1,000 layers. The precision of the numerals in these architectures also may vary from two bit (Binary CNN) to 64-bit double arithmetic.

There are several common DNN frameworks, such as TensorFlow, Theano, Keras, CNTK, and Caffe. Each of these frameworks may support multiple DNN architectures, such as VGGNet, ResNet, Inception, Xception, etc. Currently there exist more than 1,000 deep learning models available for a variety of tasks, from accurate speech recognition, to face and body detection.

As described above, there are advantages to running DNN models on edge devices. For IoT applications in remote locations, where bandwidth to the cloud may be intermittent and weak, performing most computation at an edge device is desirable. Running models on edge devices avoids large amounts of data being transmitted to a remote server. For edge devices without a strong network connection, such transmissions may introduce substantial and unacceptable delay in running a DNN model. Efficient allocation or placement of DNN models to run on edge devices helps avoid the transmission of large amount to remote servers, thus reducing overall consumption of cloud bandwidth.

An example use case, in an IoT application for agriculture, multiple cameras may be mounted on tractors that stream images to edge devices for pest detection over the TV White Space spectrum, an unused portion of a frequency spectrum used for television broadcast or other transmission. Based on the result, the tractors decide whether to spray pesticide in the region. A separate processing entity could be mounted on every tractor, but such a solution quickly becomes expensive to deploy and manage. In an animal farming use case, cameras may be mounted in each barn to monitor the movement of animals, and to flag anomalies as they occur. In another use case, multiple security cameras may stream live images from a mining operation to determine if the workers are abiding by the safety regulations, and to track the movement of assets in the region.

In all the above use cases, streaming the images to the cloud or a remote server is expensive over a weak network connection. There may also be a need to run the algorithms even during a network outage. The disclosed embodiments allow the DNN models to run on the edge devices, and therefore, run efficiently even when there is a network outage or a weak network connection.

Running the DNN models on edge devices reduces the response time in contrast to running the DNN models in the cloud. Although recent advances allow mobile devices to run the DNN models, there may still be devices without a DNN ASIC where running the DNN models on the edge device would be useful. In addition, running the DNN models on the edge device may be more battery efficient compared to running the DNN on the device.

Although IoT edge systems have been built, there is little to no support for running DNN models. Running DNN models use a large amount of processing resources from processing cores, such as CPU and GPU cores. Adding a GPU may seem sufficient to add support for DNNs, however, a single GPU can cost $1,000 dollars, and typically supports a single DNN model for a single camera stream. In the examples described above, support for multiple camera streams from IoT cameras or phones is needed. Further each camera stream might use multiple DNN models to process the image stream. Adding an extra GPU, therefore, for each model on each camera stream quickly becomes cost prohibitive. The disclosed embodiments solve this problem by proposing new components within the network edge that enables an edge device with a limited number of CPU/GPU cores to support an increasing number of camera streams and DNN models.

One benefit of the disclosed embodiments is supporting Deep Learning workloads on edge devices with a limited number of GPU and CPU cores while attempting to ensure three desired properties: performance, graceful degradation, and support for available DNN models.

For a given number of streams and DNN models, and the available resources, the disclosed embodiments schedule DNN workloads to minimize the time taken to process all the workloads. With an increase in the number of camera streams, and DNN models, embodiments may throttle workloads and distribute resources so that the system continues to run without starving any stream or model. These limitations may be exposed to the network operator.

As mentioned earlier, there are many DNN models that have been built by engineers and data scientists worldwide. Instead of shipping edge devices with pre-trained models, embodiments support various existing models that are available, for example available on the Internet. Supporting available DNN models enables a network operator to use the best cow detector model from one developer and the best sheep detector model from another developer. These models may be written in different frameworks and could use very different architectures. Therefore, having precise information of DNN models on an edge device at the time of setup is not feasible.

FIG. 1 is a system diagram of a framework 100 that supports DNN workloads on an edge device in accordance with respective examples. The framework 100 includes one or more cameras 102A, 102B, 102C that provide image data, e.g., streams, to DNN models 112A, 112B, and 112C. The DNN models 112A-112C may then be ran on various streams to create DNN workloads. The DNN models 112A-112C may be downloaded from the Internet. Each stream may have a DNN model that processes the stream. This may be specified by the network operator.

Each DNN model 112A-112C has a given architecture and framework 114. After the DNN model has been downloaded to a local device available to the edge device, the framework 100 determines the DNN model's resource requirements using a profiler 110. The resource requirements may include how much how much time the DNN model takes to run on a number of CPU cores or GPU cores under different utilizations. In an example, the profiler 110 uses a machine learning technique for estimating the resource requirements of each DNN model to avoid profiling running all possible scenarios. The profiler 110 learns the dependency of tunable DNN parameters such as sampling rate, batch size, precision, and system resources such as CPU, GPU, memory utilizations on the performance throughput of DNN models.

The framework 100 also includes a sampler 104. The cameras 102A-102C may stream video data at frame rates such as 30 fps, 60 fps, 120 fps, etc. Each stream, therefore, contains a significant amount of data. The image data, however, likely contains redundant information between frames. Traditional systems handle this redundant information by doing key frame extraction on incoming video streams to identify distinct frames by comparing Structural Similarity (SSIM) scores for every consecutive frame followed by thresholding. The sampler 104 does this in a more adaptive way where the sampler 104 determines an optimal sampling rate assignment for each stream which depends on the relative importance of the DNN and the incoming stream. The sample rate is one of the components which has a direct correlation with the time and resource requirement of a DNN model.

The framework 100 includes an allocator 106 that uses the profiler 104 to handle system resource allocation for the DNN workloads that will be executed on available cores 116A, 116B, 116C, and 116D. The allocator 106 includes two subcomponents: a core allocator and a DNN parameter allocator. The core allocator allocates of one or more cores 116A-116D to each DNN workload based on resource requirement of a DNN workload and current system utilization. The DNN parameter allocator takes the input from the allocator 106 and profiler 110 to assign various DNN parameters to each of the DNN workloads to maximize a specified optimization criteria.

The allocator 106 uses the learned performance model profiler for each DNN model and current system utilization. The allocator 106 formulates allocation of DNN workloads as an optimization problem for assigning system resource and DNN parameters to each DNN workload while maximizing the specified optimization criteria and following the constraints that arise from hardware limitations. The output of the allocator 106 is then fed into a scheduler 108 that decides the execution scheme for each of the DNN workloads.

The scheduler 108 leverages the insights about DNN structures to determine when and how to run each DNN workload. Compared to traditional user workloads, DNN workloads are predictable. Modern day convolutional neural networks (CNNs) typically have a number of convolutional layers followed by fully connected layers at the end. The scheduler 108 exploits the properties of these layers to handle execution of the DNN workloads in an efficient way while maintaining the resource allocation provided by allocator 106. Each of the components of the framework 100 are described in greater detail below.

There has been a large body of work on profiling code, either for estimating run time or for determining the resource requirements. The results are sometimes used by the operating system for allocation of the available resources. Traditionally there are two types of profilers: static profilers that estimate resource consumption without executing any code and dynamic profilers that estimate the resource consumption at runtime.

Due to variability in coding conventions across various frameworks such as CNTK, TensorFlow, Torch, Caffe, etc. using static profiles is not feasible. Accordingly, a dynamic profiler 110 is used along with insights about the DNN model to design the profiles.

An easy but inefficient way to achieve the scheduling objective is via exhaustive profiling which involves executing all possible configurations for all available DNN models and find the best configuration for each model. The shortcoming of such exhaustive profiling is its incredibly high costs. Assuming that there are P different configurations and there are L load levels, P*L profiling experiments would have to be ran. In addition, measuring average latency requires a relatively long-time span to measure enough samples to achieve statistical stability due to the stochastic queuing behaviors. Accordingly, exhaustive profiling is not a viable option for profiling.

A goal of the profiler 110 is to do the accurate profiling of each DNN model while requiring few training examples. In an example, the profiler 110 does lightweight profiling by running each of the DNN models in quarantine and keeps track of system resource usage. The profiler 110 keeps track of various system resources such as CPU, GPU and memory usage while varying various DNN parameters which are described below.

Figure 2:
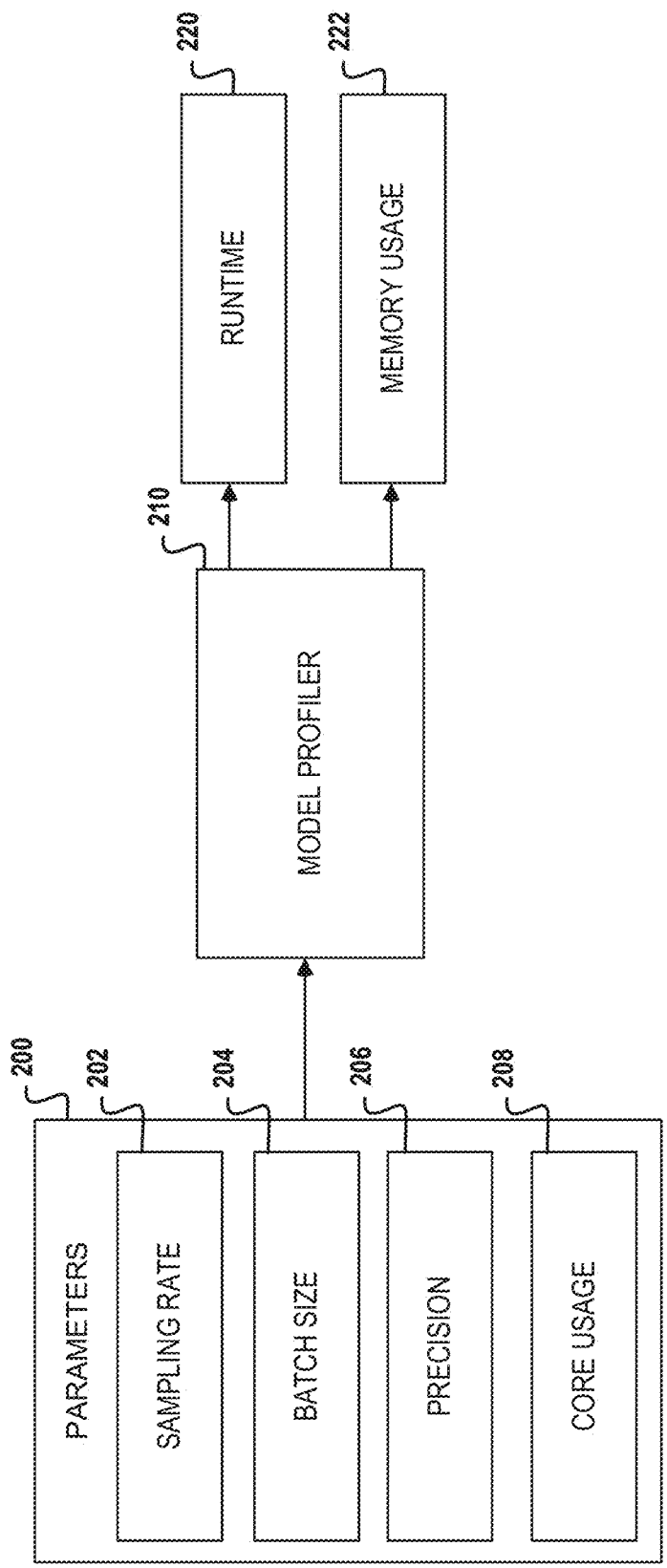
FIG. 2 is a system diagram of a profiler for DNN model in accordance with respective examples.

FIG. 2 is a system diagram of a profiler for DNN models in accordance with respective examples. Runtime parameters 200 that used by the profiler include a sampling rate 202, a batch size 204, a precision 206, and a CPU core utilization 208. The batch size 204 is an indication of how many frames/images are processed at one time by a DNN workload. For example, a DNN workload may process 16, 32, 64, 100, etc. frames at once. The profiler 110 uses these inputs 200 and predicts the run time 220 and memory usage 222 of a DNN workload based on the DNN model. The profiler may use a machine learning algorithm, such as a linear regression model, to create a model 210 for a DNN model. Once learned, the performance model 210 may be used to determine an estimate runtime 220 and memory usage 222 of the DNN workload based on the input parameters 200 to the DNN workload.

Sampling rate denoted by Sr controls the frames per second which are to be processed by a DNN workload. Each model may use a different sampling rate. For example, a DNN running animal detection may run at five fps while an intruder detection may be run at 30 fps. Based on the relative importance and resource requirements of each DNN workload, the allocator 106 or the scheduler 108 decides what sampling rate to assign to each DNN workload.

Figure 3B:
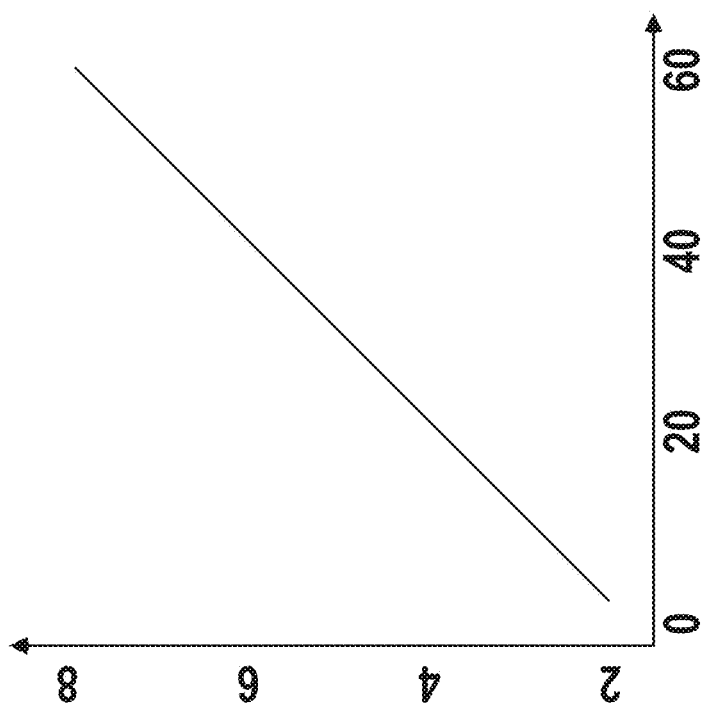
FIGS. 3A-3B are graphs showing the effect of increasing the batch size of workload in accordance with respective examples.
Figure 3A:
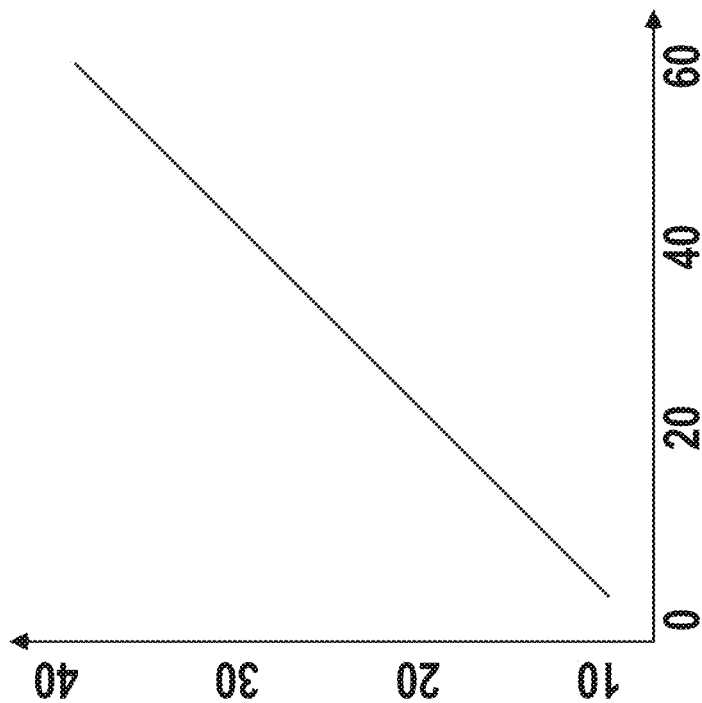

Another parameter for the profiler 110 is a batch size 204. Rather than processing a single image, a DNN workload may process a batch of images and then perform an inference on that batch. Processing images in a batch may give a significant speedup. FIGS. 3A-3B are graphs showing the effect of increasing the batch size of workload in accordance with respective examples. FIG. 3A illustrates the effect of increasing the batch size for a VGG 16 architecture from 1 to 64, which only increases runtime from 10 to ~50 seconds. FIG. 3B illustrates the effect of increasing the batch size for a RESNET 18 architecture. Typically, increasing the batch size leads to a reduction in inference time taken per frame but increases the resource utilization for a DNN workload. The batch size is a variable for the profiler 110 denoted by Bs. Using the determined profile, the scheduler 108 chooses a batch size for each DNN workload.

Precision is another parameter of the profiler 110 and may be denoted by Pc. The precision of a DNN model denotes what data type is being used to store the weights of the DNN model. Most commonly used data types are int (1 byte), float (4 byte) and double (8 byte). DNN model's trained on large datasets typically use double precision for the training. Other DNN models may use model compression which use low precision arithmetic and that reduces the resource requirement of the DNN model but at the cost of accuracy. Typically reducing the precision of the DNN model leads to much less resource requirement but leads to decrease in accuracy of the model as well. The precision value for each DNN model is controlled by the scheduler 108. In an example, more critical DNN workloads are run with a high precision while less critical DNN workloads are run using low precision values.

Traditional core allocation schemes rely on random allocation where each core is randomly assigned to a job or a greedy allocation where each incoming job is allocated to the core with lowest usage. In the case of DNN workloads these allocation schemes will not give optimal results because these allocations do not consider the structure and resource requirement of each DNN model. Accordingly, these allocation schemes will lead to inferior performance. What core is assigned to each DNN workload plays a significant role in the efficient scheduling. Typically scheduling a DNN workload on a core which is already under heavy load will lead to inferior performance compared to a core with less load. Ci denotes the core utilization of the ith core. A core may be a CPU core a GPU core. The core allocation scheme is described in greater detail below.

Figure 4A:
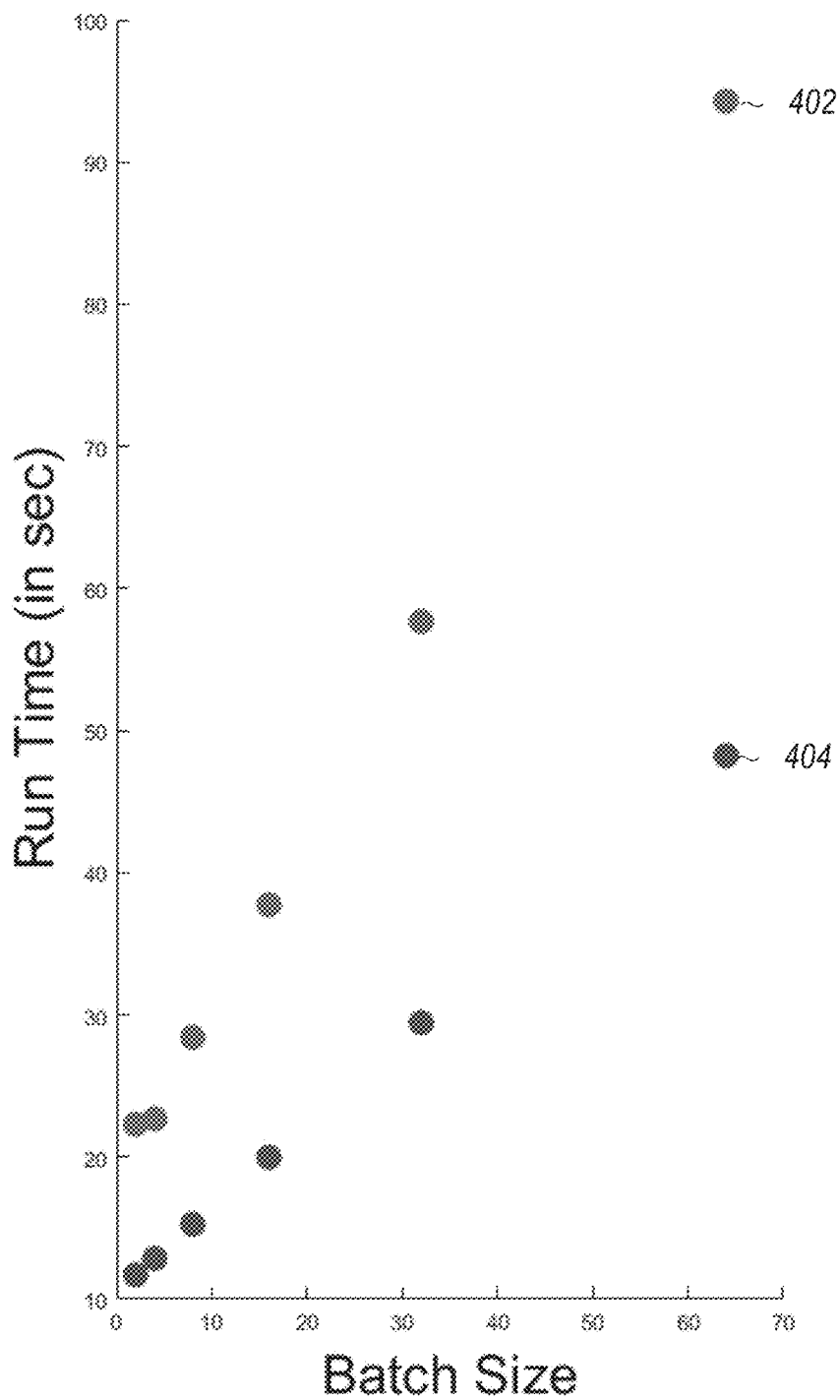
FIGS. 4A, 4B, and 4C are graphs showing training data used for the profiler in accordance with respective examples.
Figure 4B:
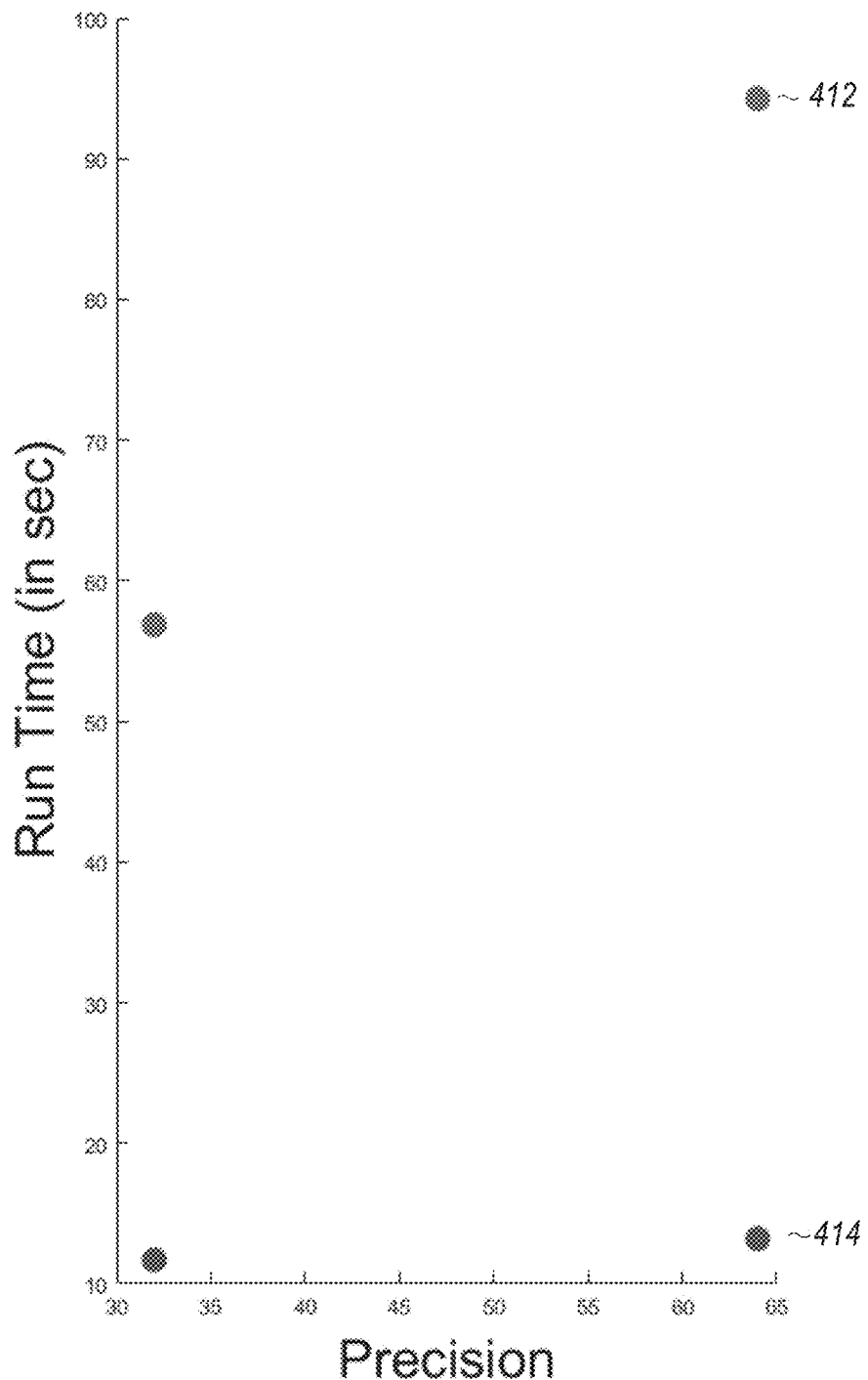
Figure 4C:
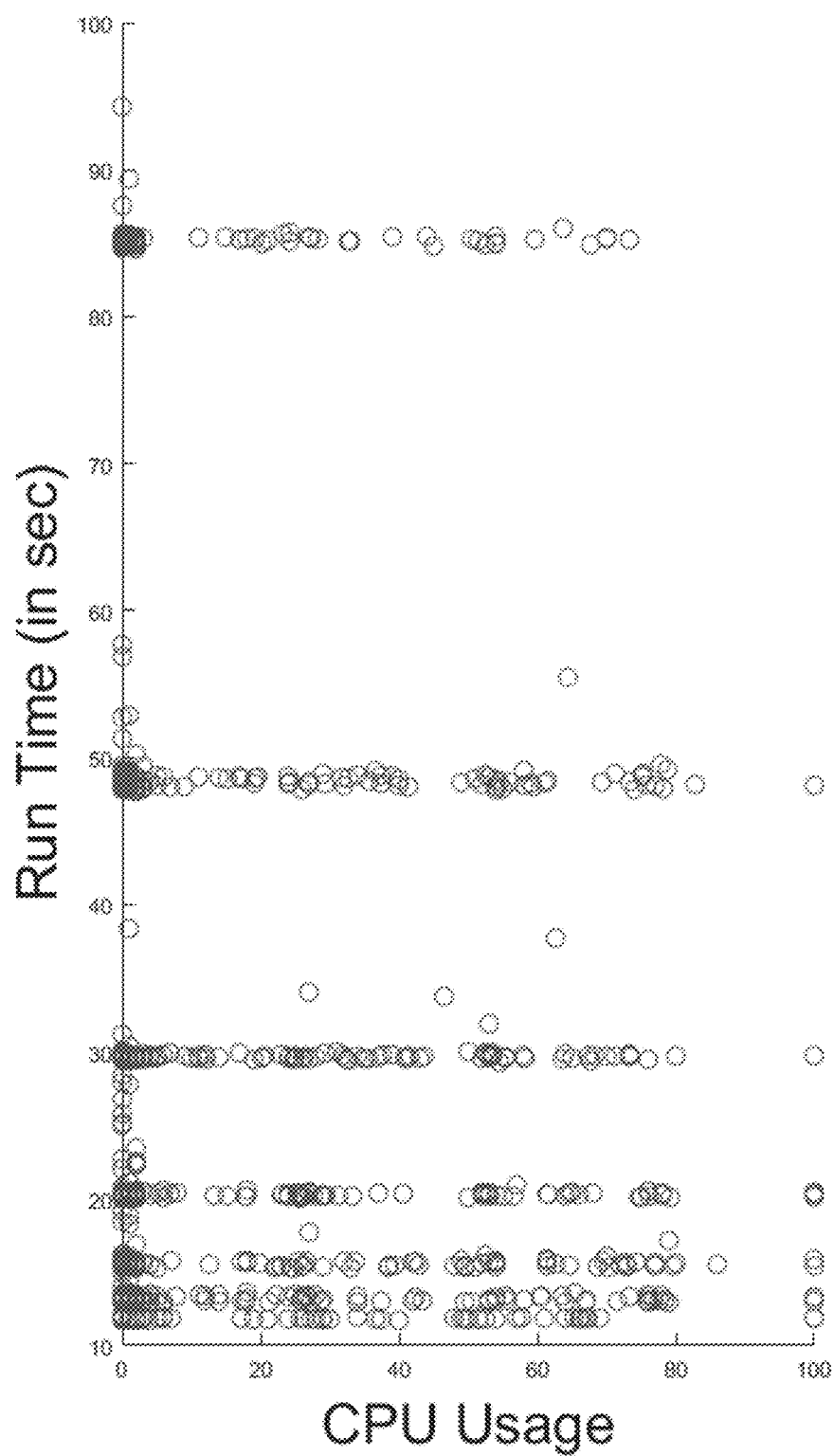

The profiler 110 uses training data to generate a performance model for a DNN model. This performance model is used to determine predicted resource requirements for an instance of the DNN model, e.g., a DNN workload. Creating a performance model may be a supervised learning problem, where given a value of Sr, Ci, Bs, and Pc, the performance model predicts the time taken and peak RAM usage of a DNN workload. In an example, for each DNN model, a performance model is separately learned from training data. Training data may be generated in various ways. For example, training data may be generated for the profiler 110 by running a DNN model while varying batch size, sampling rate, precision and CPU core utilizations in a randomized way. For exhaustively varying the core utilizations, various cores may be put under heavy load so that training data covers all the possible scenarios which might occur when running the DNN models in real-life. Using this approach, training data may be generated in 5-10 minutes for each DNN model. FIGS. 4A, 4B, and 4C are graphs showing training data used for the profiler in accordance with respective examples. FIG. 4A illustrates maximum 402 and minimum 404 run time values for varying batch sizes. FIG. 4B illustrates maximum 412 and minimum 414 values of run time for varying precision values. FIG. 4C illustrates the run time for various DNN models for varying CPU core usage. These figures show that each metric may play a crucial role in controlling the time and memory taken by a DNN model for execution.

The generated training data, as described above, may be used to learn a performance model for each DNN model. In an example, the performance model is learned by formulating a regression problem where given a DNN model and parameters Sr, Ci, Bs, and Pc the performance model predicts the run time and peak RAM usage of a given DNN model. Linear regression techniques may be used for learning the performance model. The performance model may be one of a constant model, linear model, interactions model, pure quadratic model, or a quadratic model. Once the performance models for the DNN models 112A-11C are generated, the allocator 106 may allocate resources of the framework 100 to run the DNN workloads.

Traditional approaches for doing resource allocation rely heavily on starting with a random allocation and then measuring the performance of the system. The allocation may then be updated and performance is measured again. Doing this for system resource allocation is even more challenging because system resource allocation is a time and resource consuming process. In addition, what the allocation scheme learns is highly dependent on the current system configuration which might be affected by external factors. Using a model profiler reduces this laborious task significantly as how much time a DNN workload will run given current system configuration and DNN parameters may be inferred without running any allocation scheme on the system.

The allocator 106 handles the task of resource allocation for the DNN workloads. The allocator 106 takes as input the system resource utilization from the profiler 110, and then determines an efficient resource allocation scheme.

The allocator 106 decides various parameters for a DNN workload. In an example, the parameters include a sampling rate, a batch size, precision, and core allocation. For simplicity, each DNN workload is assumed to only be assigned to a single core but this can be easily extended to multicore allocations as described later.

In an example, two allocators are used. A core allocator which allocates a core, e.g., a CPU or GPU core, to each DNN workload and a DNN parameter allocator which determines the parameters for each DNN workload. Both allocations may be optimized using an alternating optimization way.

As an example, to optimize the core allocations and the parameter allocations, the DNN parameters may be randomly initialized. For given DNN parameters, the optimal core allocation scheme is calculated for DNN workloads. Then, given the core allocation scheme, the optimal DNN parameters are determined. The optimal core allocation is then determined again, this time using the optimized DNN parameters. Using the latest core allocation, the DNN parameters may be optimized again. This process repeats until there is convergence. The core and DNN parameter allocators are described in greater detail below.

In an example, to allocate cores, the allocator 106 assigns each DNN workload to a specific core 116A-116D based on current CPU utilization and DNN model specifications. By using the profiler 110, the allocator 108 has greater knowledge of how each DNN workload is going to behave across various core allocations and may optimize for the same. By using the profiler 110, how much time a DNN workload will take on each core given its percentage utilization may be estimated. In an example, the allocation problem is formulated as a Hungarian matching problem which can be solved in polynomial time and guarantees an optimal solution.

In an example, the mathematical model used by the allocator 108 is defined as: Let $c_{i,j}$ be the cost of assigning the ith core to the jth DNN workload. The cost matrix is defined to be the n×m matrix where n is the number of cores and m is number of DNN workloads. An assignment is a set of n entry positions in the cost matrix, no two of which lie in the same row or column. The sum of the n entries of an assignment is its cost. An assignment with the smallest possible cost is called an optimal assignment.

For the task of DNN workload to core matching, $C_{i,j}$ is defined as the output of the profiler 110, which given current core utilization and the DNN model predicts the time it will take for a DNN workload that uses the DNN model to run on that core. The following variables may also be used by the allocator 108.

$\{C_{ij}\}$ cost matrix, where $c_{i,j}$ is the cost of DNN workload i to run on core j.

$\{X_{ij}\}$ is the resulting binary matrix, where $x_{i,j}=1$ if and only if ith worker is assigned to jth job.

$\sum_{j=1}^{N} X_{ij}=1 \forall i \in 1, N$ one core to one DNN workload assignment.

$\sum_{j=1}^{N} X_{ij}=1 \forall j \in 1, N$ one DNN workload to one core assignment.

$\sum_{i=1}^{N}\sum_{j=1}^{N}=C_{ij}X_{ij}=1 \Rightarrow$ min total cost function.

Figure 5:
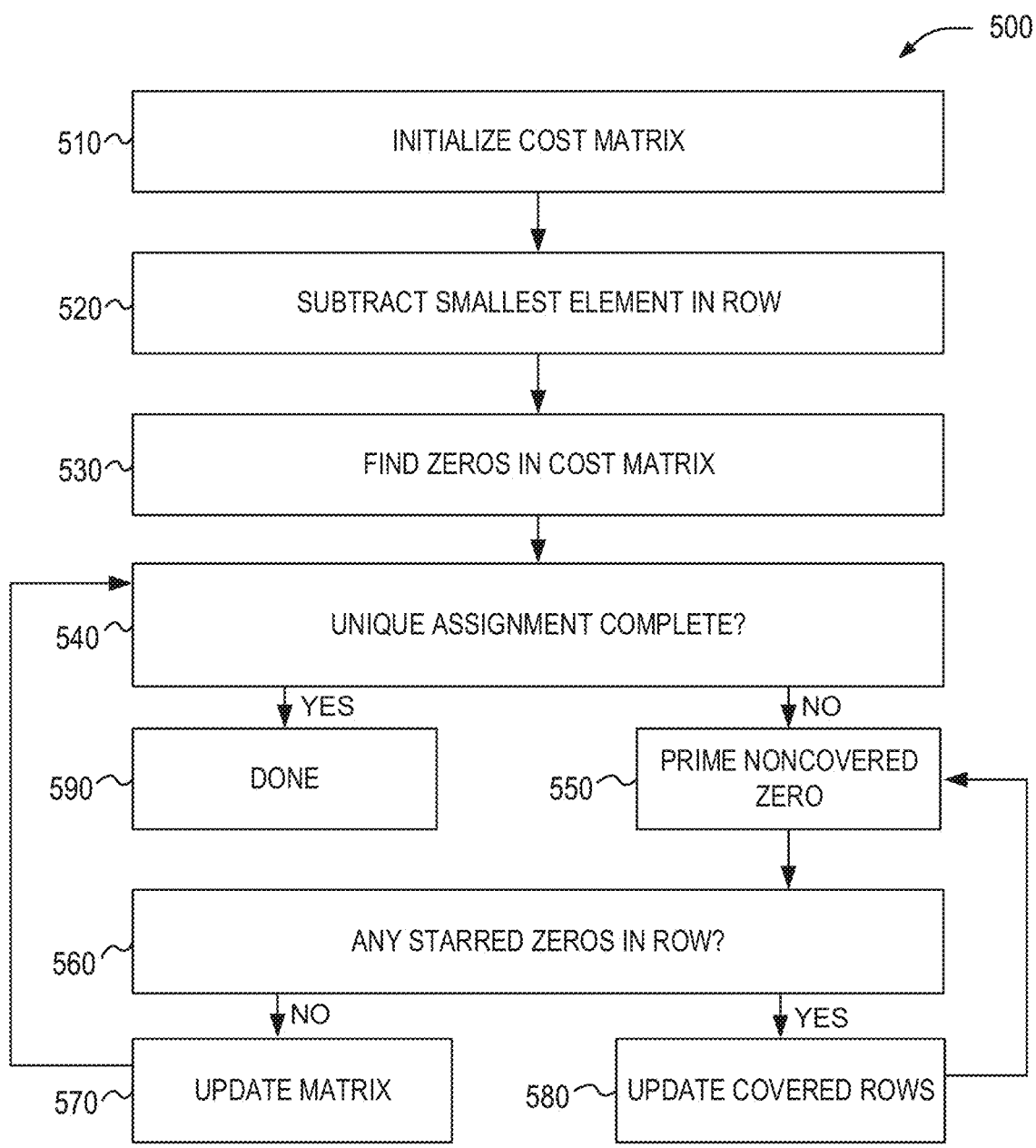
FIG. 5 is a flow diagram of a process for allocating DNN workloads to cores in accordance with respective examples.
Figure 6A:
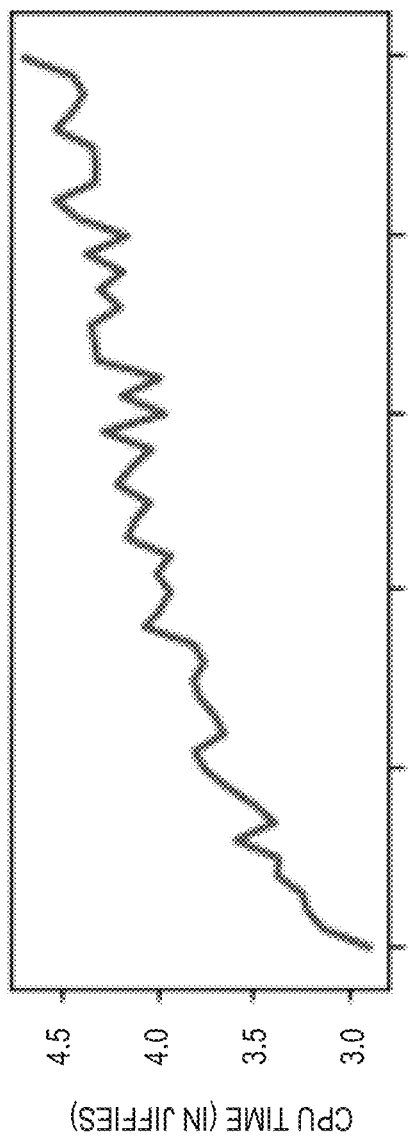
Figure 6B:
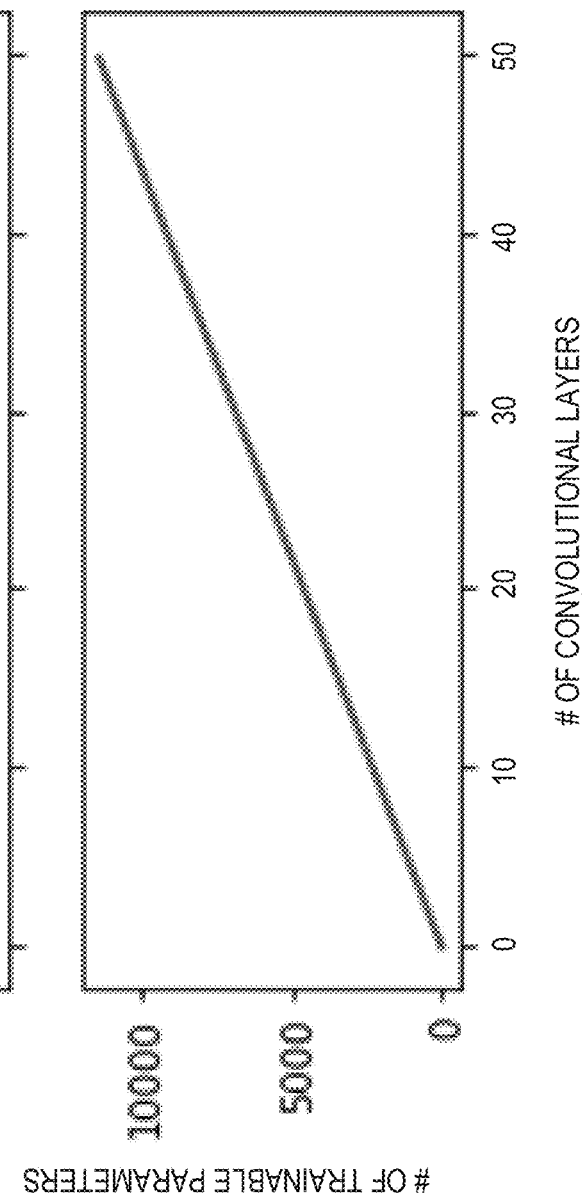

Using the variables above, in an example the allocator 108 allocates DNN workloads to cores by the following process. FIG. 5 is a flow diagram of a process for allocating DNN workloads to cores in accordance with respective examples.

At 510, an n×m matrix called the cost matrix is created and initialized in which each element represents the cost of assigning one of n workers to one of m jobs. Rotate the matrix so that there are at least as many columns as rows and let k=min(n, m).

At 520, for each row of the matrix, find the smallest element and subtract it from every element in its row.

At 530, find a zero (Z) in the resulting matrix. If there is no starred zero in its row or column, star Z. Repeat for each element in the matrix.

At 540, cover each column containing a starred zero. At 590, if K columns are covered, the starred zeros describe a complete set of unique assignments. In this case, the allocator 108 uses the unique assignments to assign DNN workloads to CPU cores.

At 550 if there were not K columns covered, find a noncovered zero and prime the noncovered zero. At 560, if there are any starred zeros in the row with the noncovered zero is determined. If there is no starred zero in the row containing this primed zero proceed to 570. Otherwise, cover this row and uncover the column containing the starred zero. Continue in this manner until there are no uncovered zeros left. Save the smallest uncovered value and proceed to 580.

At 570, construct a series of alternating primed and starred zeros as follows: let Z0 represent the uncovered primed zero found at 550. Let Z1 denote the starred zero in the column of Z0 (if any). Let Z2 denote the primed zero in the row of Z1 (there will always be one). Continue until the series terminates at a primed zero that has no starred zero in its column. Unstar each starred zero of the series, star each primed zero of the series, erase all primes and uncover every line in the matrix and return to 540.

At 580, add the value found at 550 to every element of each covered row, and subtract it from every element of each uncovered column. After this, return to 550.

At 590, assignment pairs are indicated by the positions of the starred zeros in the cost matrix. If Ci, j is a starred zero, then the element associated with row i is assigned to the element associated with column j.

This algorithm has a polynomial time complexity of O(n3). If there are N DNN workload to allocate to M cores. When N≤M then the above described process to get the core allocation may be used. In this case, however, better performance may be achieved by allocating the most demanding job to multiple cores so we add rows corresponding to the most demanding job and leftover cores. For example, if there are three DNN workload to schedule on six CPU cores and the initial algorithm suggested the allocation of:

DNN1=1 with a cost of 15
DNN2=3 with a cost of 10
DNN3=4 with a cost of 20

This allocation leaves cores 2, 5, and 6 unallocated. Since DNN3 has the highest cost, DNN3 may be allocated to cores 2, 4, 5, and 6. In this example, (4,2) (4,5) (4,6) can be added as rows to the matrix which corresponds to a multi-CPU core allocation of core 4 with leftover cores. In another example, the unallocated cores may be distributed to the DNN workloads based on a ratio of the costs. In the above example, there are three unallocated cores. DNN3 has a total cost ratio of 20/45, ~44%; DNN2 has a total cost ratio of 10/45, ~22%; and DNN1 has a total cost ratio of 15/45, ~33%. In this example, the unallocated cores may be distributed based on the total cost ratio. As an example, each DNN workload may be allocated an extra core based on multiplying the total cost ratio to the available cores and rounding. In another example, any allocation value that is less than zero may be dropped. In this example, DNN3 would not be assigned a core. The three cores may then be distributed based on the total cost of all DNN workloads as described above or the total cost may be recalculated based on the DNN workloads whose allocation value was greater than zero.

When N>M, the number of DNN workload are more than number of cores. In this case, the allocation is done in a multi-pass way. In a first pass, M DNN workload are allocated to M cores. Then load of each of the M cores is incremented by the respectively scheduled DNN workload. The process is then run again to again find out the optimal assignment for next M workload. This process is repeated until all the DNN workload are allocated to at least one core.

The above process determines which DNN workload to run on which core to maximize the efficient resource utilization while getting optimal throughput out of the DNN workloads. Now the other DNN parameters may be allocated.

After determining the core allocation scheme for the DNN workloads, the scheduler 108 optimizes for other parameters such as sampling rate, batch size and precision for each of the DNN workloads. Using the profiler 110, the allocator 108 has fine grained information about the effect of the DNN parameters on each DNN workload. The allocator 108 leverages this information while doing the parameter allocation.

This problem may be formulated as an optimization problem where an objective is to minimize constraints that arise from system resources. In optimization problems defining the objective is an important step towards formulating and solving the problem. There are several objectives that may be optimized. These include:

max(Ti), where Ti denotes the time taken by a DNNi workload to process T seconds of streaming video. This ensures that all the DNN workloads have finished execution on T seconds of video.

min(Ti), where Ti denotes the time taken by a DNNi workload to process T seconds of streaming video. This ensures that at least one DNN workload has finished execution on T seconds of video.

R, this metric compares current system resource utilization to the maximum available resources to ensure all system resources are utilized in an efficient manner.

Ci, where Ci denotes the cost associated with offloading the computation of DNNi to the cloud.

$\Sigma_{j=1}^{N} W_i T_i$, where Ti denotes time taken by DNNi workloads and Wi denotes the relative importance of the DNNi workload. This can be used to assign relative importance to the DNN workloads so that DNN workloads with more importance finish more quickly than others.

In an example, the objective function may be any weighted combinations of the above defined objectives. As an example, the objective function that is being minimized may be:

$$\alpha*\max(Ti)+\beta*Cost$$

where Ti is the time taken by the DNNi workload; Cost is the cloud cost including bandwidth, VM and other factors; and α and β are weighting factors that specifies the relative importance of max(Ti) compared to the cloud cost. This objective function will be used in the examples below.

In an example, the following variables may be defined and determined from the DNN's model from the profiler 110. Assume the following variables:

Sri is the sampling rate for the DNNi workload;
Bsi is the batch size for the DNNi workload;
Pci is the precision for the DNNi workload;
Ci is the core allocated to DNNi workload;
CPUj denotes the utilization of core j;
$Acc_{i,j}$ denotes the accuracy of a DNNi workload with precision Pcj;

Cloudi is 1 if DNNi workload is allocated to the cloud and 0 if DNNi workload is allocated to a local CPU core;

MaxSr is the maximum allowed sampling rate for a DNN workload. In an example, this value is set to 30;

MaxBs is the maximum allowed Batch Size for a DNN workload. In an example, this value is set to 256;

MaxPc is the maximum allowed precision for a DNN workload. In an example, this value is set to 64. Four is the lowest precision value and corresponds to integer arithmetic;

Maxmem is the maximum memory available to the DNN workloads and framework 100;

MinAc is the lower bound on Accuracy of each of the DNNs workload;

F(i) denotes the model profiler which given the core utilization CPUj and (Sri, Bsi, Pci) predicts the run time of DNNi workload on CPU core j;

G(i) denotes the model profiler which given the (Sri, Bsi, Pci) predicts the peak memory usage of DNNi workload;

MaxCost is the maximum allowed cost to incur for offloading the computation to the Cloud; and N is the number of DNN workloads to be scheduled.

In addition, based on the above variables, some variables have the following ranges:

$$1 \leq Sr \leq \text{Max}Sr \forall\ i \in N$$

$$1 \leq Bs \leq \text{Max}Bs \forall\ i \in N$$

$$4 \leq Pc \leq \text{Max}Pc \forall\ i \in N$$

$$\sum_{i \in N} G(Sri, Bsi, Pci) \leq \text{Max}mem$$

$$\text{Min}Ac \leq Acc_{i,j} \forall\ i \in N$$

Based on the above formulas, Ti may be calculated as:

$$Ti = F(Sri, Bsi, Pci, CPU(Ci)) * T * \frac{Sri}{Bsi} \forall\ i \in N \text{ where Cloud} = 0$$

$$Ti = F'(Sri, Bsi, Pci, CPU(Ci)) * T * \frac{Sri}{Bsi} \forall\ i \in N \text{ where Cloud} = 1$$

In the case of a cloud core allocation for the DNNi workload, the CPUi and Ci refer to the cloud processing core utilization and cloud core allocated respectively. The above optimization problem may be an integer programming problem with non-linear constraints. The optimization problem has the following unique properties: may have multiple local optima; may not be smooth; the number of parameters is large; and may be noisy or stochastic. Based on these properties, simple linear programming formulations will not work. In an example, a genetic algorithm to solve the described optimization problem is used.

The scheduler 108 may keep track of the results of previous inputs. Accordingly, instead of doing fixed sampling for each DNN workload, the allocator 106 may take the previous results into account and dynamically control the sampling for each of the image streams. This is very useful in practical scenarios. For example, increasing the sampling rate may occur when an image stream has multiple events happening at the same time. This smart sampling allows DNN workloads to have increased sampling rate as needed.

The disclosed embodiments may consider cloud resources in addition to local resources. As DNN models are becoming deeper and require more processing power to run, the system resources available to the end-user might not be sufficient to achieve a desired performance. Virtual Machines (VM's) hosted on the cloud and on demand are an option for increasing performance.

The scheduler 108 may completely automate the VM process without need for manual intervention. A network operator may specify a maximum amount to spend on cloud resources, bandwidth cost and desired throughput. The described allocator 106 may first try to use the local system resources to maximize the throughput of DNN workloads and if that is less than the user desired throughput then automatically offloads some DNN workloads to cloud resources. All the processing involved such as transfer of data, transfer of models, fetching the results, etc. is automatically handled by the scheduler 108 without manual intervention.

A typical CNN includes a number of stacked convolutional-pooling layers followed by fully connected layers at the end. The convolutional layer's parameters include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. The pooling layer is used to progressively reduce the spatial size of the representation, to reduce the number of parameters and amount of computation in the network, and hence to also control overfitting Finally, after several convolutional and max pooling layers, the high-level reasoning in the neural network is done via fully connected layers. A fully connected layer takes all neurons in the previous layer, e.g., a fully connected, pooling, or convolutional layer, and connects it to every single neuron within the fully connected layer. Fully connected layers are not spatially located anymore, so there are no convolutional layers after a fully connected layer.

The scheduler 108 analyzes each of the DNN models based on time taken for each layer during a single forward pass. Typically, the earlier layers of CNNs are usually convolutional layers and contain a fewer number of parameters but consumes the majority of the computation. This is because during the convolutional operator the model is learning only $N \times (C1 \times C2)$ where N is the number of convolutional filters and $C1 \times C2$ denotes the filter size. During one forward pass, these filters are applied to the input image in a sliding window fashion which is a major cause behind the high compute resource requirements.

Deeper layers in the CNN usually consist of fully connected layers which contain a very large number of parameters but require very few computational resources. These are the full matrix multiplication operations which have been highly optimized.

As is evident from FIGS. 6A, 6B, 6C, and 6D, even though convolutional layers (CL) have very few learnable parameters and therefore, require much less RAM these layers still require more core processing time compared to fully connected layers (FCL) which typically have more learnable parameters and require more RAM. This is seen by comparing the CPU times of linear lays in FIG. 6C with the CPU time of convolutional layers in FIG. 6A.

Convolutional Neural networks architectures may follow the following pattern:

INPUT⇒[[CONV⇒RELU]*N⇒*POOL?]*M⇒
  [FC⇒RELU]*K⇒FC where the CONV denotes a convolutional layer, RELU indicates rectified linear units, FC denotes fully connected layers, * indicates repetition and POOL? indicates an optional pooling layer.

The majority of architectures for CNNs have a number of convolutional layers followed by fully connected layers that only occur at the end. The scheduler 108 takes advantage of the fact that core and RAM requirements of convolutional layers and fully connected layers are orthogonal to each other. The scheduler 108 schedules multiple DNN workloads in such way a way that one DNN workload starts at the convolution layers when another DNN workload reaches the fully connected layer processing stage. The schedule 108 may do this by determining the time a first DNN workload will reach its fully connected computation. When this time is reached, a second DNN workload may be started that starts by processing convolutional layers.

In an example, there two DNN workloads, DNN1 and DNN2, with the following architecture:

DNN1: INPUT⇒[[CONV ⇒RELU]*$N$⇒
POOL?]*2⇒[FC ⇒RELU]*1⇒FC

DNN2: INPUT⇒[[CONV ⇒RELU]*$N$⇒
POOL?]*3⇒[FC⇒RELU]*2⇒FC.

Based on output from the profiler 110, the scheduler 108 calculates how much time for each of the above DNN workloads to finish the computation for each layer. In an example, it may take TC1 and TC2 time to finish the convolutional layers computations and TF1 and TF2 to finish the fully connected layers computations for DNN1 and DNN2 respectively. Starting both DNN workloads at the same time may slow down convolutional layers computations as both the DNN workloads are in the core processing intensive stage. In addition, RAM utilization may also be inefficient. Further, if processing the fully connected layers for DNN1 and DNN2 occur at the same time the network core usage will be inefficient and RAM usage will be very high. The RAM usage may slow down the processing of the DNN workloads and may even cause the system to run out of memory.

In contrast, the scheduler 108 may start DNN1 first and then DNN2 after TC1 time so that while DNN1 uses more memory and less CPU resources DNN2 is ran while DNN2 uses more CPU resources but less memory resources. Thus, system resources or better utilized and used more efficiently leading to better throughput. The same scheduling may be extended to accommodate more than two DNN workloads.

In some IoT applications, there may be interdependencies between DNN workloads such as when a person detection model detects a positive match a face matching DNN workload may be emphasized. Since the scheduler 108 controls and handles the execution of each of these DNN workloads, the scheduler 108 may consider the interdependencies. In an example, the interdependencies between the DNN workloads may be modeled via a graph structure.

Figure 7:
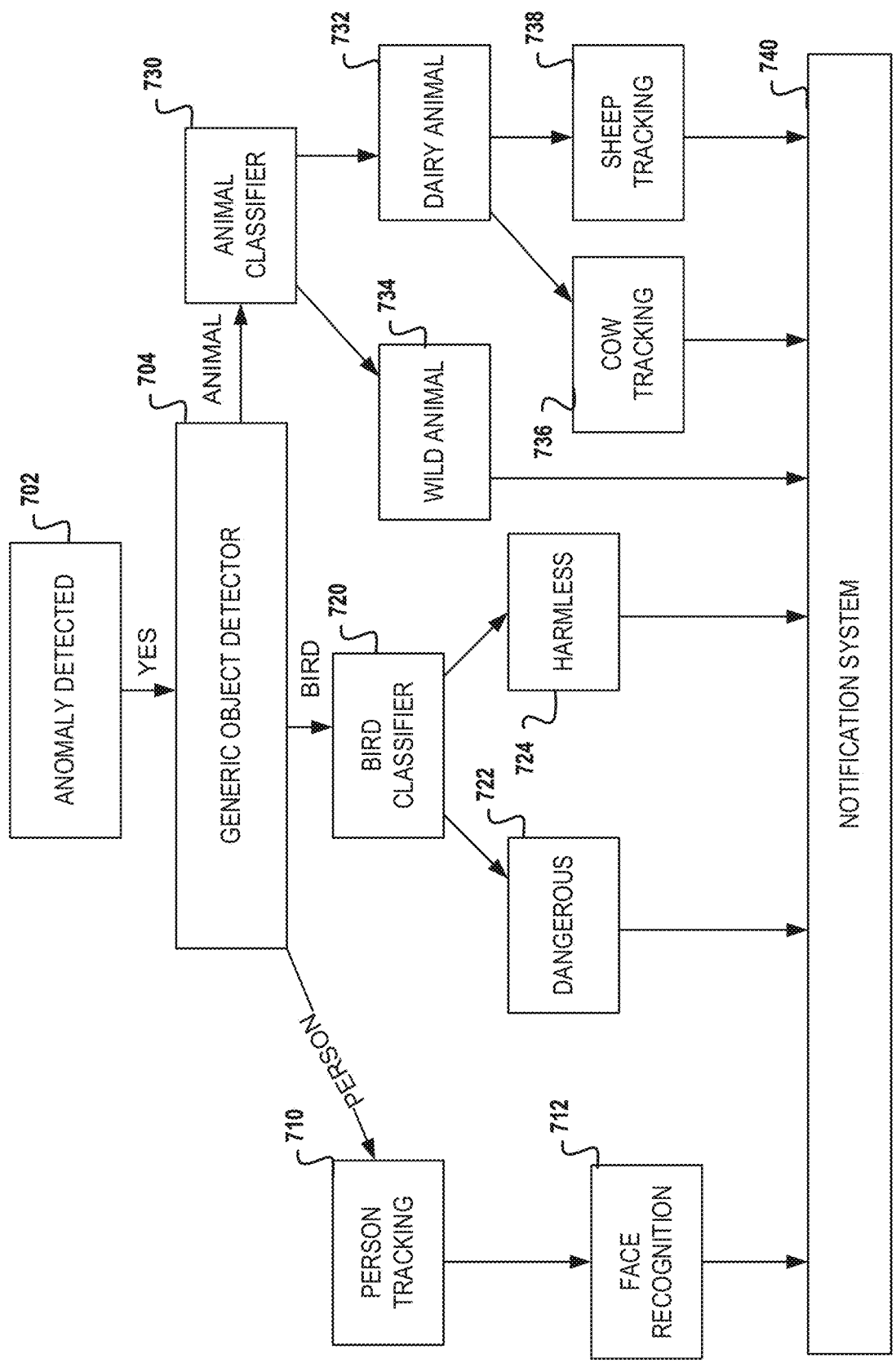
FIG. 7 illustrates a DNN dependency graph in accordance with respective examples.

FIG. 7 illustrates a DNN dependency graph in accordance with respective examples. Initially, the weight of the head node is assigned to 1 and the weights of the children nodes are set to 0. When the head node's right condition is satisfied, the weight of the right node is increased until it finishes the execution. After the execution, the weight reverts to 0. Using this kind of recursive weight propagation, very large interdependencies between the DNN workloads may be handled. In addition, the various DNN workloads may use different DNN frameworks 114. For example, a face recognition model may be triggered in CNTK when a person detection model, using a TensorFlow framework, fires a positive detection.

FIG. 7 highlights one such potential use case of an IoT application for agriculture. A root node 702 corresponds with a binary anomaly detection classifier workload which outputs one if something anomalous happens in the video stream. A positive trigger subsequently triggers a generic object detector workload at node 704 which analyzes a frame and gives bounding boxes with corresponding labels. Based on output of this workload, the next workload that is triggered may be one of:

a person detection workload 710 which tracks a person followed by face recognition workload 712. An alert may be sent to a farmer that alerts the farmer to the person using a notification system 740;

a bird detection workload 720 which classifies birds into two categories—dangerous 722 or not dangerous 724 for crops. If dangerous bird count is more than a certain threshold then a notification may be sent to the farmer via the notification system 740; or animal tracking workload 730 which may trigger a dairy animal identification workload 732 in the farm or also alert the farmer if any wild animal 734 is detected. The dairy animal identification workload 732 may classify a dairy animal into a cow 736 or a sheep 738.

The described system was implemented and tested over various test data. In one experiment, the profiler 110 as tested. Using proposed training data generation discussed above, 1,500 training data points were generated for each model. 80% of the data points were selected randomly for training with rest used for testing. Example DNN workloads were tested using various different frameworks. The profiler 110 was tested using different models. Tables 1, 2, and 3 below summarize the results of one set of experiments.

TABLE 1

| Models | VGG16 | Resnet18 | DenseNet161 | SqzNet |
|---|---|---|---|---|
| Constant | 22.85 | 3.31 | 20.25 | 2.26 |
| Linear | 11.18 | 1.55 | 7.39 | 0.82 |
| Interactions | 1.16 | 0.045 | 0.16 | 0.03 |
| Pure Quadratic | 9.64 | 1.50 | 7.66 | .7738 |
| Quadratic | 1.15 | .03 | 0.16 | 0.03 |

Table 1 compares performance model accuracies for predicting runtime of a DNN workload given a sampling rate, batch size, CPU core usage, and precision across a number of architectures. Values denote the root mean square error from actual runtime of a DNN.

TABLE 2

| Models | VGG16 | Resnet18 | DenseNet161 | SqzNet |
|---|---|---|---|---|
| Constant | 144.76 | 29.61 | 227.57 | 25.24 |
| Linear | 86.65 | 17.57 | 126.70 | 12.39 |
| Interactions | 0.05 | 0.047 | 0.07 | 0.03 |
| Pure Quadratic | 78.63 | 15.99 | 121.25 | 11.62 |
| Quadratic | .03 | .02 | 0.065 | 0.024 |

Table 2 compares performance model accuracies for predicting memory usage of a DNN workload given a sampling rate, batch size, CPU core usage, and precision across a number of architectures. Values denote the root mean square error from true memory usage in MB.

TABLE 3

| Models | VGG16 | Resnet18 | DenseNet161 | SqzNet |
|---|---|---|---|---|
| Min(Memory) | 14.59 | 3.41 | 13.98 | 2.67 |
| Max(Memory) | 504.94 | 103.04 | 736.03 | 80.25 |
| Min(Runtime) | 11.70 | 1.79 | 2.52 | 0.96 |
| Max(Runtime) | 94.27 | 13.02 | 67.60 | 7.63 |

Table 3 provides of an overview of data for various DNN frameworks. The Min(memory) and Max(memory) rows indicate the minimum and maximum amount of a memory the framework used when running various DNN workloads. The Min(RunTime) and Max(RunTime) rows indicate the minimum and maximum time in seconds that various DNN workloads took to complete. The wide variation between minimum and maximum values emphasize the value of the profiler 110 to accurately predict memory usage and run times. The data shown in Tables 1 and 2 indicate that the described profiler 110 is able to accurately predict DNN memory usage and run times across various architectures.

In some experiments, the profiler 110 treats the performance model creation as a regression problem given values of Sr, Bs, Pc, and Ci the model predicts the amount of time that a DNN workload will run. Various linear regression techniques may be used. For example, linear regression techniques were used successfully in various experiments and achieved good performance. For example, a quadratic regression model for the VGG architecture was used and achieved a root mean square error of 1.15 for runtime prediction on the test data. This is shown in Table 1 above. This denotes that our model predicted the time it will take for the VGG network to run with less than a 1.15 s error. This is impressive considering the time ranges in the test data are 11 s to 94 s as seen in Table 3 above. Similarly, as seen from Table 2 a quadratic regression model which takes as input Sr, Bs, and Pc is able to predict the memory usage of a DNN workload with root mean square error less than 0.06 MB.

The core allocator of the allocator 106 was also tested. The efficiency of the core allocator was compared with traditional resource allocators as described below:

Random Allocation: a core was randomly assigned to each of the DNN workloads;

Greedy Allocation: the first DNN workload was assigned to the core with least utilization and so on for all the incoming DNN workloads; and the disclosed core allocator as described above that assigns a core to each DNN workload.

Figure 8:
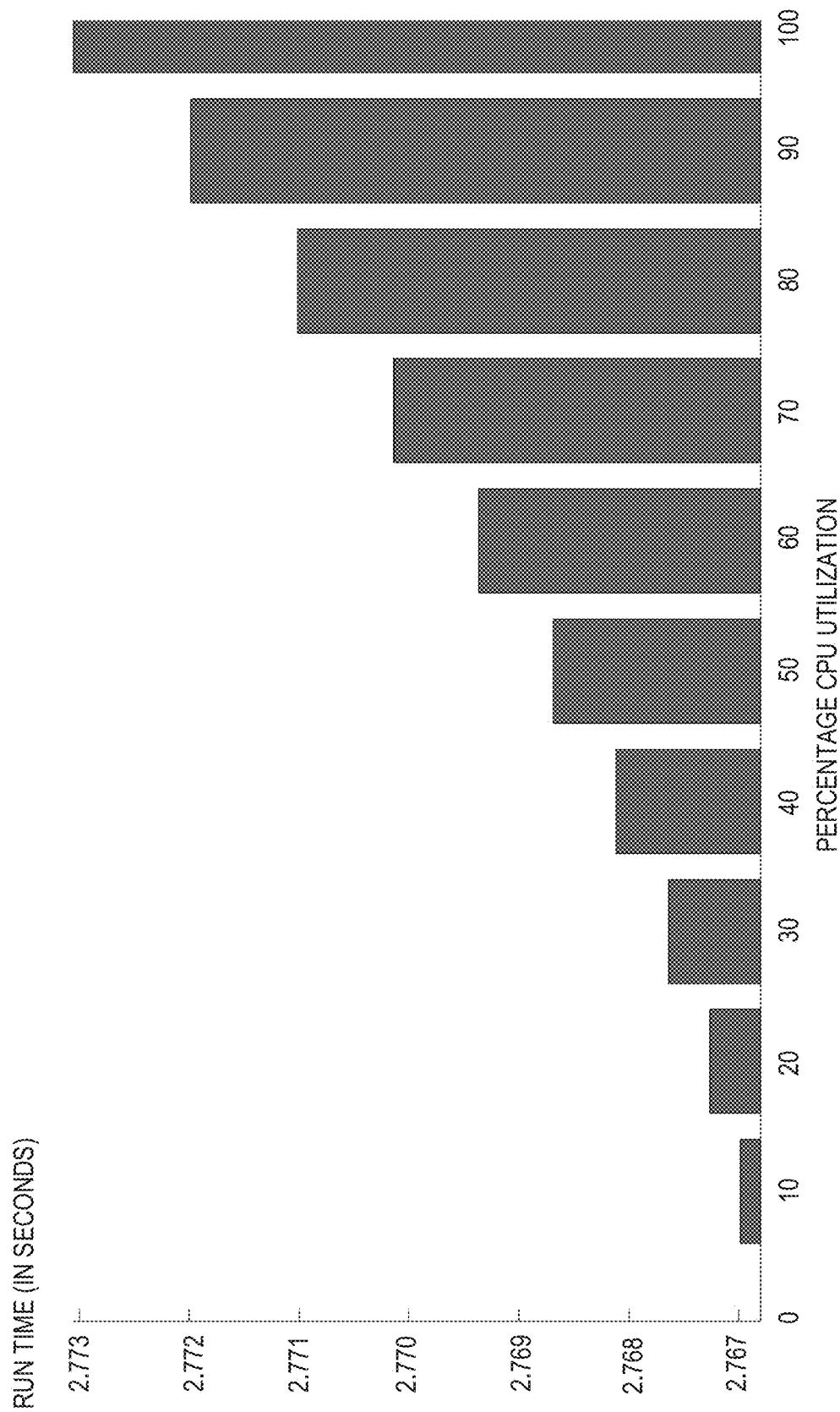
FIG. 8 illustrates the runtime of DNNs with increasing CPU load in accordance with respective examples.

In an experiment, the core allocator was run using a virtual machine with twelve cores and five DNN workloads of various architectures. The resource utilization of cores were varied. FIG. 8 illustrates the runtime of DNN workloads processing one minute of streaming data at 30 fps in accordance with respective examples. The described core allocator allocates the DNN workloads to run more efficiently than either the random or greedy allocation algorithms.

Figure 9:
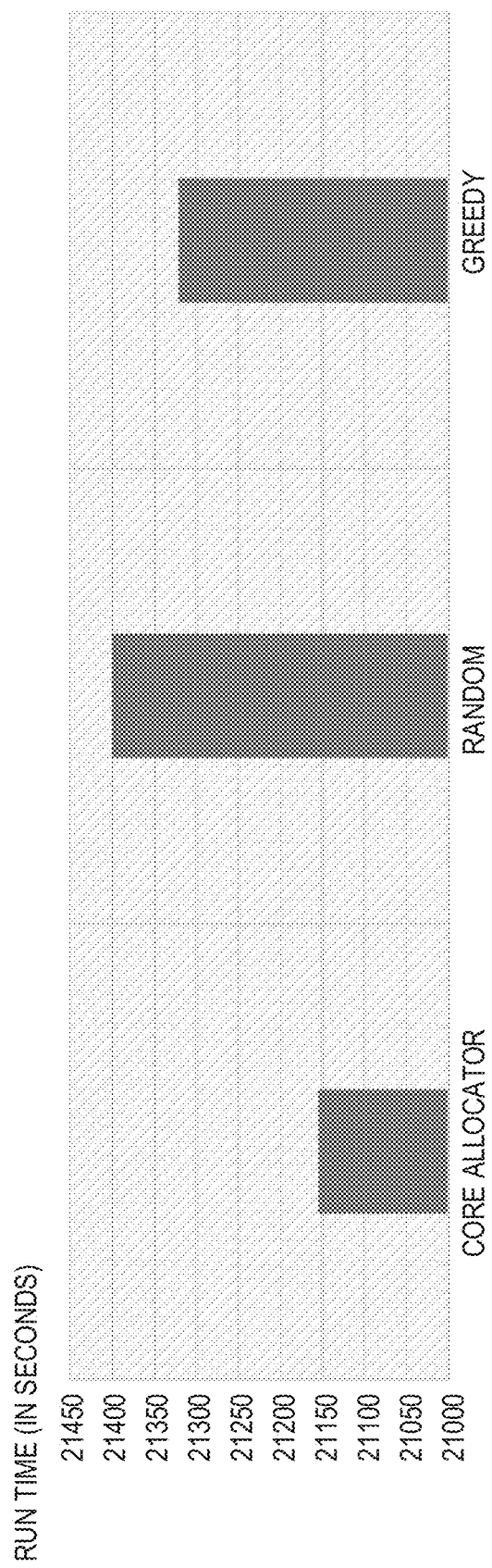
FIG. 9 illustrates the runtime of DNNs processing one minute of 30 fps stream data in accordance with respective examples.

FIG. 9 illustrates the runtime of DNN workloads with increasing core utilization in accordance with respective examples. As the core utilization increases, the allocator 106 still allocates DNN workloads to cores that still allow the DNN workloads to complete. While the runtime increases with the increase in core utilization, the DNN workloads still complete in way that the performance of the DNN workloads gracefully degrades.

In an experiment, the DNN parameter allocator was run and compared with traditional parameter allocation schemes: random or fixed allocation. To do a fair comparison with traditional resource allocation primitives, equal weights were assigned to each DNN workloads. The run time for each of the parameter allocation schemes was then compared.

Figure 10:
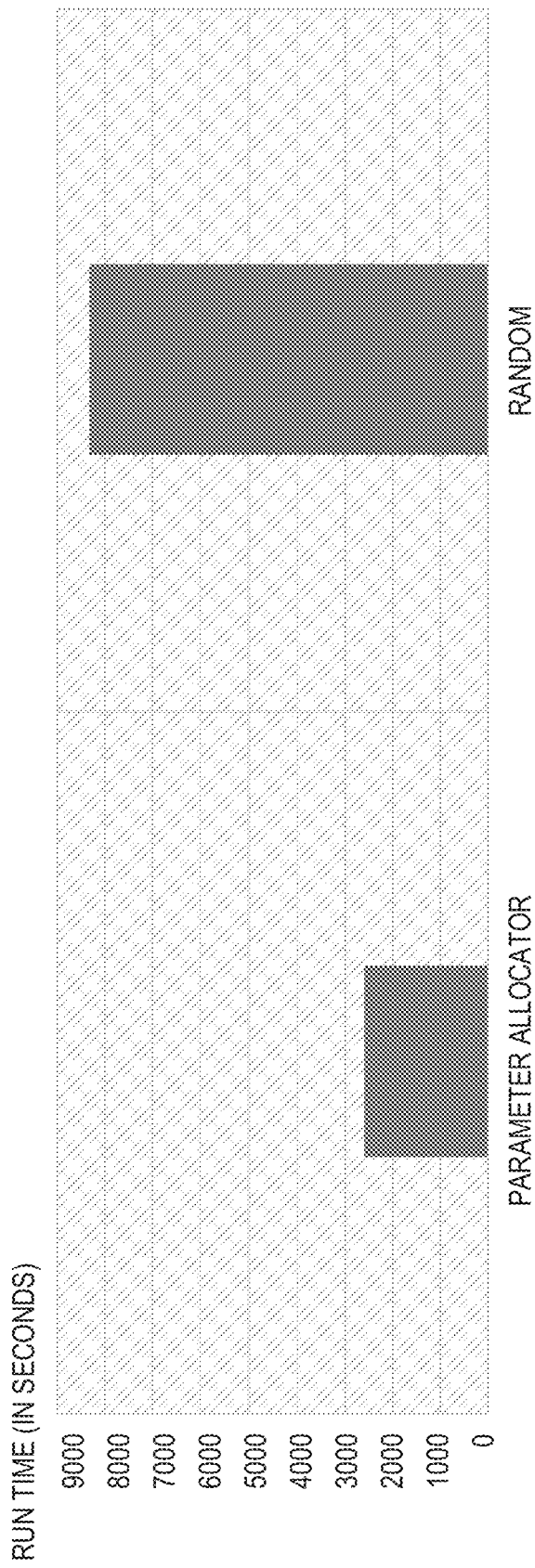
FIG. 10 illustrates the runtime of DNNs with different parameter allocation scheme in accordance with respective examples.

FIG. 10 illustrates the runtime of DNN workloads with different parameter allocation scheme in accordance with respective examples. As seen in FIG. 10, the DNN parameter allocator within the allocator 106 ran substantially faster than traditional resource allocation schemes. In the experiment, the DNN workloads processed one minute of video at 30 fps. These results show the large effect the DNN parameters have on execution time and how their optimal allocation is important to achieve good throughput.

Figure 11:
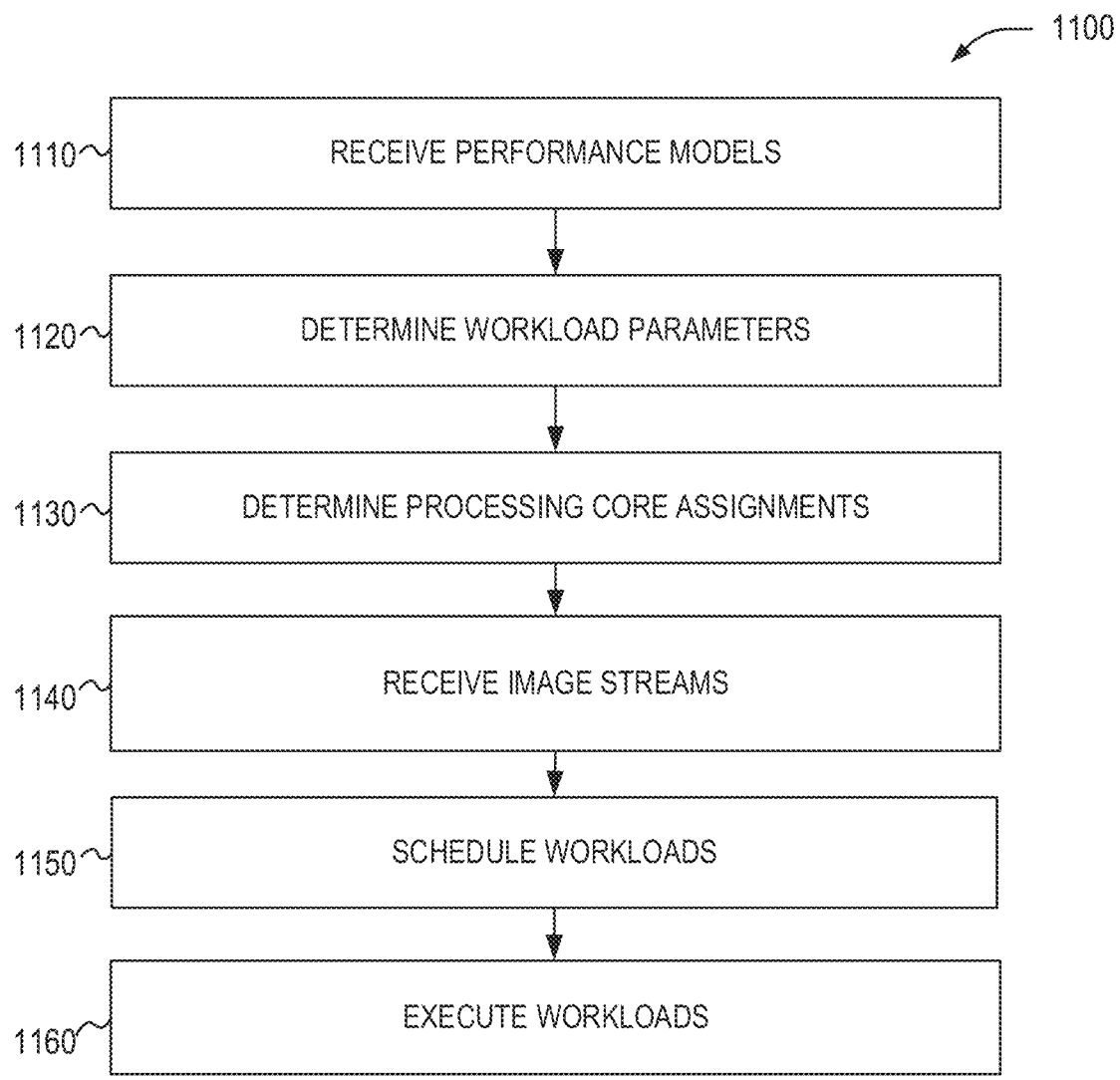
FIG. 11 is a flow diagram of a process for allocating DNN workloads to cores in accordance with respective examples.

FIG. 11 is a flow diagram of a process 1100 for allocating DNN workloads to cores in accordance with respective examples. At 1110, performance models for the DNN workloads are received. The profiler may have previously generated/learned the performance model for each of the DNN workloads. At 1120, an allocator determines DNN workload parameters for running each of the DNN workloads. The parameters may include a batch size, a sampler size, and a precision. At 1130, the DNN workloads are assigned to processing cores. The assignment may be based on current processing core utilization, current available memory, and the profiled amount of processing core utilization and memory the DNN workloads need. At 1140, image streams are received. The image streams are mapped to DNN workloads. At 1150, the DNN workloads are scheduled to be executed. At 1160, the DNN workloads are executed at the scheduled time on the assigned processing core. In addition, the corresponding image stream is provided o the DNN workload. After a period of time, the scheduling process may run again to continue to schedule any uncompleted DNN workload as well as new DNN workloads.

Figure 12:
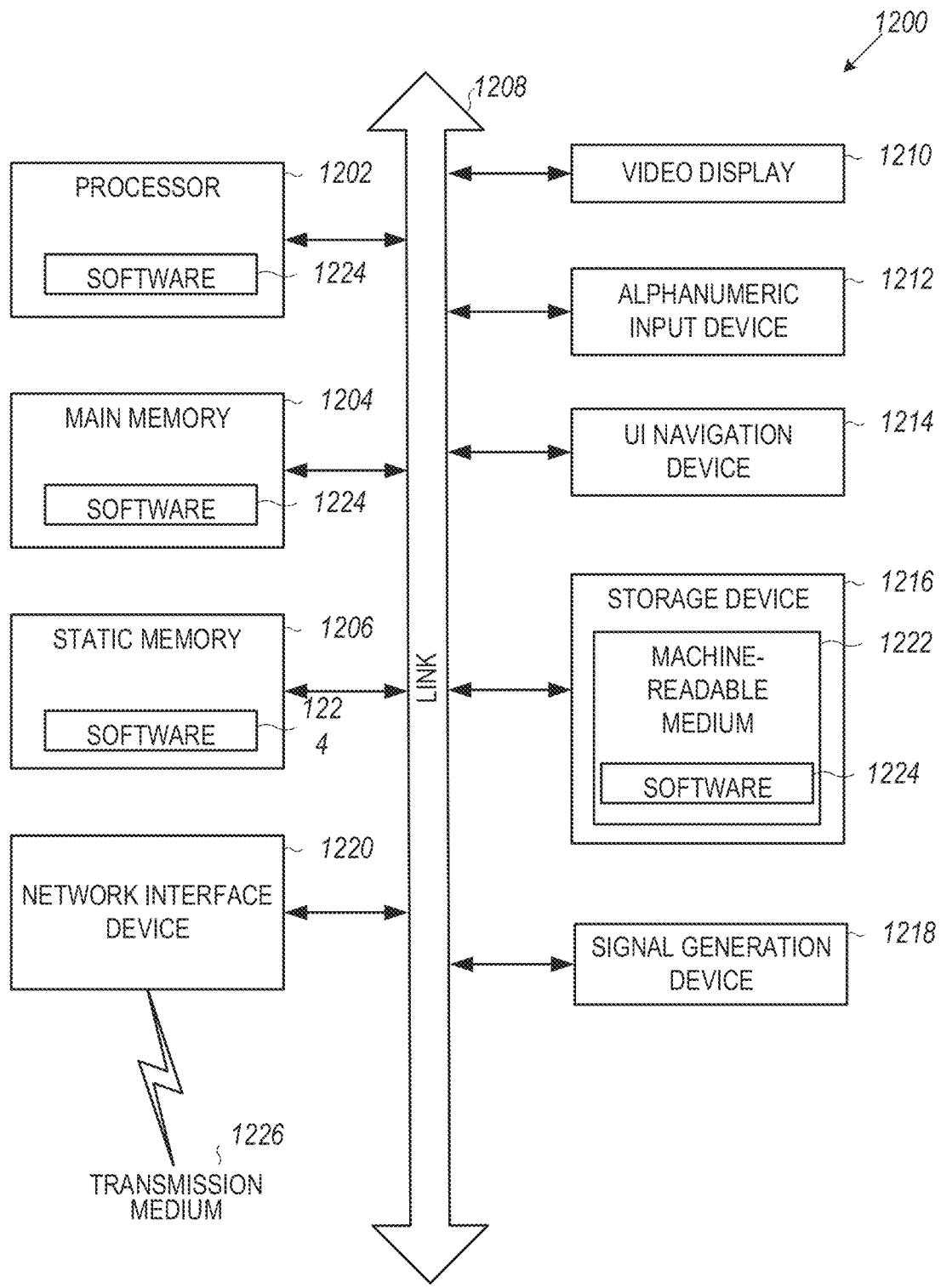
FIG. 12 is an example computing device that can be used in conjunction with the technologies described herein.

FIG. 12 is an example computing device that can be used in conjunction with the technologies described herein. In alternative embodiments, the computing device 1200 may operate as a standalone device or may be connected (e.g., networked) to other computing devices. In a networked deployment, the computing device 1200 may operate in the capacity of a server communication device, a client communication device, or both in server-client network environments. In an example, the computing device 1200 may act as a peer computing device in peer-to-peer (P2P) (or other distributed) network environment. The computing device 1200 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may be an implementation of an edge device, may include processing cores 116A-116D, may implement the allocator 106, scheduler 108, and profiler, and perform the method of FIG. 11.

Computing device 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via a link (e.g., bus) 1208. The computing device 1200 may further include a display unit 1210, an input device 1212 (e.g., a keyboard), and a user interface (UI) navigation device 1214 (e.g., a mouse). In an example, the display unit 1210, input device 1212, and UI navigation device 1214 may be a touch screen display. In an example, the input device 1212 may include a touchscreen, a microphone, a camera (e.g., a panoramic or high-resolution camera), physical keyboard, trackball, or other input devices.

The computing device 1200 may additionally include a storage device (e.g., drive unit) 1216, a signal generation device 1218 (e.g., a speaker, a projection device, or any other type of information output device), a network interface device 1220, and one or more sensors 1221, such as a global positioning system (GPS) sensor, compass, accelerometer, motion detector, or other sensor. The computing device 1200 may include an input/output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 1216 may include a computing-readable (or machine-readable) storage media 1222, on which is stored one or more sets of data structures or instructions 1224 (e.g., software) embodying or utilized by any one or more of the techniques or functions described herein. In an example, at least a portion of the software may include an operating system and/or one or more applications (or apps) implementing one or more of the functionalities described herein. The instructions 1224 may also reside, completely or at least partially, within the main memory 1204, within the static memory 1206, and/or within the hardware processor 1202 during execution thereof by the computing device 1200. In an example, one or any combination of the hardware processor 1202, the main memory 1204, the static memory 1206, or the storage device 1216 may constitute computing device (or machine) readable media.

While the computer-readable storage media 1222 is illustrated as a single medium, a "computer-readable storage media" or "machine-readable storage media" may include a single medium or multiple media (e.g., a centralized or distributed database, and/or associated caches and servers) configured to store the one or more instructions 1224.

In an example, a computer-readable storage media or machine-readable storage media may include any medium that is capable of storing, encoding, or carrying instructions for execution by the computing device 1200 and that cause the computing device 1200 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 1220 may use the transfer protocols to transmit data using transitory propagating signals.

In an example, the network interface device 1220 may include one or more physical jacks (e.g., Ethernet, coaxial, or phone jacks) or one or more antennas to connect to the communications network 1226. In an example, the network interface device 1220 may include one or more wireless modems, such as a Bluetooth modem, a Wi-Fi modem or one or more modems or transceivers operating under any of the communication standards mentioned herein. In an example, the network interface device 1220 may include a plurality of antennas to wirelessly communicate using at least one of single-input multiple-output (SIMO), multiple-input multiple-output (MIMO), or multiple-input single-output (MISO) techniques. In some examples, the network interface device 1220 may wirelessly communicate using Multiple User MIMO techniques. In an example, a transmission medium may include any intangible medium that is capable of storing, encoding or carrying instructions for execution by the computing device 1200, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for scheduling neural network workloads on an edge device, the method comprising operations performed using an electronic processor, the operations comprising:
   receiving, from a plurality of cameras, a plurality of image streams;
   receiving parameters for each of a plurality of neural network workloads, wherein each of the neural network workloads is associated with one of a plurality of neural network models, and wherein each of the neural network workloads includes at least one image of the plurality of image streams;
   receiving tracked previous results of workload scheduling;
   determining a performance model for each of the plurality of neural network models based on the parameters, wherein a respective performance model includes predicted resource requirements for a corresponding neural network model;
   determining processing core assignments, for a plurality of processing cores for each of the neural network workloads, based on minimizing a cost function associated with the performance model for each of the plurality of neural network models and the predicted resource requirements, and based on the tracked previous results, the cost function minimizing a maximum time taken to process each of the plurality of neural network workloads and using a relative importance of each of the plurality of neural network workloads and a relative importance of image streams of the plurality of image streams; and
   scheduling each of the neural network workloads to run on the plurality of processing cores based on a minimization of the cost function associated with the determined processing core assignments.

2. The method of claim 1, further comprising executing each of the neural network workloads with the determined parameters on the determined processing core based on the scheduling and the assigned image stream.

3. The method of claim 1, further comprising modeling the performance model for each of the plurality neural network models.

4. The method of claim 3, wherein the modeling comprises:
   running each of the plurality of neural network models a plurality of times with varying parameters and varying processing core utilizations to generate training data; and
   training the performance model based on the generated training data.

5. The method of claim 1, wherein the parameters comprise a batch size, a sampling rate, and precision.

6. The method of claim 1, wherein the scheduling comprises:
   determining a first neural network workload has an increased core processing need for a first initial period of time based on a configuration of a first neural network model associated with the first neural network workload;
   determining a second neural network workload has an increased core processing need for a second initial period of time based on a configuration of a second neural network model associated with the second neural network workload; and
   scheduling the second neural network workload to start execution after the first initial period of time.

7. The method of claim 6, wherein the first and second neural networks are convolutional neural networks.

8. The method of claim 1, wherein a first neural network workload is dependent on a second neural network workload, wherein determining the parameters comprises:
   detecting, using the second neural network workload, a match in the assigned image stream; and
   increasing a memory usage parameter of the first neural network workload based on the second neural network detecting the match.

9. The method of claim 8, wherein the first neural network uses a first neural network framework, and wherein the second neural network uses a second, different neural network framework.

10. The method of claim 1, wherein the determining processing core assignments further comprises:
    determining a plurality of unassigned processing cores, wherein a number of neural network workloads is less than a number of available processing cores;
    assigning additional processing cores to a neural network workload based on a runtime value from the corresponding performance model.

11. A system for scheduling neural network workloads on an edge device, the system comprising:
    an allocator configured to:
    receiving, from a plurality of cameras, a plurality of image streams;
    receiving parameters for each of a plurality of neural network workloads, wherein each of the neural network workloads is associated with one of a plurality of neural network models, and wherein each of the neural network workloads includes at least one image of the plurality of image streams;
    receiving tracked previous results of workload scheduling;
    determine a performance model for each of the plurality of neural network models based on the parameters, wherein a respective performance model includes predicted resource requirements for a corresponding neural network model;
    determining processing core assignments, for a plurality of processing cores for each of the neural network workloads, based on minimizing a cost function associated with the performance model for each of the plurality of neural network models and the predicted resource requirements, and based on the tracked previous results, the cost function minimizing a maximum time taken to process each of the plurality of neural network workloads and using a relative importance of each of the plurality of neural network workloads and a relative importance of image streams of the plurality of image streams;
    a scheduler configured to schedule each of the neural network workloads to run on the plurality of processing cores based on a minimization of the cost function associated with the determined processing core assignments; and
    a plurality of processing cores configured to execute each of the neural networks with the determined parameters on the determined processing core based on the scheduling and the assigned image stream.

12. The system of claim 11, further comprising a profiler configured to model the performance model for each of the plurality neural network models.

13. The system of claim 12, wherein to model the performance model the profiler is further configured to:

run each of the plurality of neural network models a plurality of times with varying parameters and varying processing core utilizations to generate training data; and train the performance model based on the generated training data.

14. The system of claim 11, wherein the parameters comprise a batch size, a sampling rate, and precision.

15. The system of claim 11, wherein to schedule the scheduler is further configured to:
determine a first neural network workload has an increased core processing need for a first initial period of time based on a configuration of a first neural network model associated with the first neural network workload;
determine a second neural network workload has an increased core processing need for a second initial period of time based on a second neural network model associated with the second neural network workload; and
schedule the second neural network workload to start execution after the first initial period of time.

16. The system of claim 15, wherein the first and second neural networks are convolutional neural networks.

17. A non-transitory computer-readable storage media storing computer-executable instructions for scheduling neural network workloads on an edge device, the stored instructions comprising:
instructions to receive, from a plurality of cameras, a plurality of image streams;
instructions to receive parameters for each of a plurality of neural network workloads, wherein each of the neural network workloads is associated with one of a plurality of neural network models, and wherein each of the neural network workloads includes at least one image of the plurality of image streams;
instructions to receive tracked previous results of workload scheduling;

instructions to determine a performance model for each of the plurality of neural network models based on the parameters, wherein a respective performance model includes predicted resource requirements for a corresponding neural network model;
instructions to determine processing core assignments, for a plurality of processing cores for each of the neural network workloads, based on minimizing a cost function associated with the performance model for each of the plurality of neural network models and the predicted resource requirements, and based on the tracked previous results, the cost function minimizing a maximum time taken to process each of the plurality of neural network workloads and using a relative importance of each of the plurality of neural network workloads and a relative importance of image streams of the plurality of image streams; and
instructions to schedule each of the neural network workloads to run on the plurality of processing cores based on a minimization of the cost function associated with the determined processing core assignments.

18. The non-transitory computer-readable storage medium of claim 17, further comprising instructions to model the performance model for each of the plurality neural network models.

19. The non-transitory computer-readable storage medium of claim 18, wherein the instructions to model the performance model the profiler further comprises:
instructions to run each of the plurality of neural network models a plurality of times with varying parameters and varying processing core utilizations to generate training data; and
instructions to train the performance model based on the generated training data.

20. The non-transitory computer-readable storage medium of claim 17, wherein the parameters comprise a batch size, a sampling rate, and precision.

* * * * *